United States Patent
Edsall et al.

(10) Patent No.: US 10,547,544 B2
(45) Date of Patent: Jan. 28, 2020

(54) NETWORK FABRIC OVERLAY

(71) Applicant: Cisco Technology, Inc., San Jose, CA (US)

(72) Inventors: Thomas James Edsall, Los Gatos, CA (US); Navindra Yadav, Cupertino, CA (US); Francisco M. Matus, Saratoga, CA (US); Kit Chiu Chu, Fremont, CA (US); Michael R. Smith, San Jose, CA (US); Sameer Merchant, Sunnyvale, CA (US); Krishna Doddapaneni, Cupertino, CA (US); Satyam Sinha, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/855,703

(22) Filed: Dec. 27, 2017

(65) Prior Publication Data
US 2018/0139132 A1 May 17, 2018

Related U.S. Application Data

(63) Continuation of application No. 14/530,550, filed on Oct. 31, 2014, now Pat. No. 9,876,715.

(Continued)

(51) Int. Cl.
*H04L 12/741* (2013.01)
*H04L 12/46* (2006.01)
(Continued)

(52) U.S. Cl.
CPC .......... *H04L 45/74* (2013.01); *H04L 12/4633* (2013.01); *H04L 45/66* (2013.01);
(Continued)

(58) Field of Classification Search
CPC ..... H04L 12/4633; H04L 45/66; H04L 45/74; H04L 49/10; H04L 45/586; H04L 49/356;
(Continued)

(56) References Cited

U.S. PATENT DOCUMENTS

| 5,115,431 A | 5/1992 | Williams et al. |
|---|---|---|
| 7,539,131 B2 | 5/2009 | Shen |

(Continued)

FOREIGN PATENT DOCUMENTS

| CN | 102726021 | 10/2012 |
|---|---|---|
| CN | 103155500 | 6/2013 |

OTHER PUBLICATIONS

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf.org/html/draft-mahalingam-dutt-dcopsvxlan- 06, Oct. 2013, pp. 1-24.

(Continued)

*Primary Examiner* — Brian T O Connor
(74) *Attorney, Agent, or Firm* — Polsinelli PC

(57) ABSTRACT

Disclosed herein are methods of forwarding packets on a network, such as a leaf-spine network having leaf devices and spine devices. The methods may include receiving a packet at an ingress leaf device, and determining based, at least in part, on a header of the packet whether the packet is to be transmitted to a spine device. The methods may further include ascertaining based, at least in part, on a header of the packet whether to perform encapsulation on the packet, encapsulating the packet according to a result of the ascertaining, and then transmitting the packet to a spine device according to a result of the determining. Also disclosed herein are network apparatuses which include a processor and a memory, at least one of the processor or the memory (Continued)

being configured to perform some or all of the foregoing described methods.

20 Claims, 9 Drawing Sheets

Related U.S. Application Data

(60) Provisional application No. 61/900,228, filed on Nov. 5, 2013.

(51) Int. Cl.
*H04L 12/721* (2013.01)
*H04L 12/933* (2013.01)
*G06F 9/455* (2018.01)

(52) U.S. Cl.
CPC .......... *H04L 49/10* (2013.01); *G06F 9/45558* (2013.01); *G06F 2009/45595* (2013.01)

(58) Field of Classification Search
CPC ..... H04L 49/70; H04L 12/4641; H04L 45/28; H04L 45/02; H04L 45/24; H04L 41/12; H04L 41/08; H04L 41/0803; H04L 45/745; H04L 41/082; H04L 41/0866; G06F 9/45558
See application file for complete search history.

(56) References Cited

U.S. PATENT DOCUMENTS

| | | | |
|---|---|---|---|
| 7,580,409 B1 | 8/2009 | Swenson et al. | |
| 8,416,692 B2 | 4/2013 | Patel et al. | |
| 8,499,093 B2 | 7/2013 | Grosser et al. | |
| 8,837,476 B2* | 9/2014 | Banavalikar | H04L 45/72 |
| | | | 370/389 |
| 8,908,691 B2* | 12/2014 | Biswas | H04L 12/4633 |
| | | | 370/392 |
| 9,014,191 B1* | 4/2015 | Mandal | H04L 12/4633 |
| | | | 370/392 |
| 9,106,508 B2* | 8/2015 | Banavalikar | H04L 45/00 |
| 9,178,715 B2* | 11/2015 | Jain | H04L 12/4641 |
| 9,197,551 B2* | 11/2015 | DeCusatis | H04L 45/52 |
| 9,300,483 B2* | 3/2016 | Banavalikar | H04L 12/185 |
| 9,319,335 B1* | 4/2016 | Tripathi | H04L 12/4641 |
| 9,325,524 B2* | 4/2016 | Banavalikar | H04L 45/72 |
| 9,397,942 B2* | 7/2016 | Song | H04L 12/4641 |
| 9,397,943 B2* | 7/2016 | Song | H04L 12/4641 |
| 9,426,060 B2 | 8/2016 | Dixon | |
| 9,667,541 B2* | 5/2017 | Song | H04L 12/4641 |
| 9,667,551 B2* | 5/2017 | Edsall | H04L 47/20 |
| 9,755,960 B2* | 9/2017 | Moisand | H04L 12/4633 |
| 9,755,965 B1* | 9/2017 | Yadav | H04L 41/0806 |
| 9,769,078 B2 | 9/2017 | Attar et al. | |
| 9,876,711 B2* | 1/2018 | Chu | H04L 45/22 |
| 9,876,715 B2* | 1/2018 | Edsall | H04L 49/10 |
| 9,888,405 B2 | 2/2018 | Edsall et al. | |
| 10,089,127 B2* | 10/2018 | Padmanabhan | G06F 9/45558 |
| 2002/0136268 A1 | 9/2002 | Gan et al. | |
| 2003/0058837 A1 | 3/2003 | Denney et al. | |
| 2003/0058860 A1 | 3/2003 | Kunze et al. | |
| 2003/0142629 A1 | 7/2003 | Krishnamurthi et al. | |
| 2003/0223376 A1 | 12/2003 | Elliott et al. | |
| 2004/0111507 A1 | 6/2004 | Villado et al. | |
| 2005/0073958 A1 | 4/2005 | Atlas et al. | |
| 2005/0201375 A1 | 9/2005 | Komatsu et al. | |
| 2005/0213504 A1 | 9/2005 | Enomoto et al. | |
| 2005/0232227 A1 | 10/2005 | Jorgenson et al. | |
| 2006/0075093 A1 | 4/2006 | Frattura et al. | |
| 2006/0083179 A1 | 4/2006 | Mitchell | |
| 2006/0083256 A1 | 4/2006 | Mitchell | |
| 2006/0182036 A1 | 8/2006 | Sasagawa et al. | |
| 2006/0209702 A1 | 9/2006 | Schmitt et al. | |
| 2006/0215572 A1 | 9/2006 | Padhye et al. | |
| 2006/0215623 A1 | 9/2006 | Lin et al. | |
| 2006/0239204 A1 | 10/2006 | Bordonaro et al. | |
| 2006/0274657 A1 | 12/2006 | Olgaard et al. | |
| 2006/0285500 A1 | 12/2006 | Booth, III et al. | |
| 2007/0016590 A1 | 1/2007 | Appleby et al. | |
| 2007/0053303 A1 | 3/2007 | Kryuchkov | |
| 2007/0058557 A1 | 3/2007 | Cuffaro et al. | |
| 2007/0061451 A1 | 3/2007 | Villado et al. | |
| 2007/0076605 A1 | 4/2007 | Cidon et al. | |
| 2007/0091795 A1 | 4/2007 | Bonaventure et al. | |
| 2007/0097872 A1 | 5/2007 | Chiu | |
| 2007/0160073 A1 | 7/2007 | Toumura et al. | |
| 2007/0211625 A1 | 9/2007 | Liu et al. | |
| 2007/0233847 A1 | 10/2007 | Aldereguia et al. | |
| 2007/0258382 A1 | 11/2007 | Foll et al. | |
| 2007/0258383 A1 | 11/2007 | Wada | |
| 2008/0031146 A1 | 2/2008 | Kwak et al. | |
| 2008/0219173 A1 | 9/2008 | Yoshida et al. | |
| 2008/0259809 A1 | 10/2008 | Stephan et al. | |
| 2008/0259925 A1 | 10/2008 | Droms et al. | |
| 2009/0052332 A1 | 2/2009 | Fukuyama et al. | |
| 2009/0092136 A1* | 4/2009 | Nazareth | H04L 45/745 |
| | | | 370/392 |
| 2009/0116402 A1 | 5/2009 | Yamasaki | |
| 2009/0225671 A1 | 9/2009 | Arbel et al. | |
| 2009/0271508 A1 | 10/2009 | Sommers et al. | |
| 2009/0307334 A1 | 12/2009 | Maltz et al. | |
| 2010/0260197 A1 | 10/2010 | Martin et al. | |
| 2011/0268118 A1 | 11/2011 | Schlansker | |
| 2012/0195233 A1 | 8/2012 | Wang et al. | |
| 2012/0314581 A1 | 12/2012 | Rajamanickam et al. | |
| 2013/0227108 A1 | 8/2013 | Dunbar et al. | |
| 2013/0250951 A1 | 9/2013 | Koganti | |
| 2014/0006549 A1 | 1/2014 | Narayanaswamy et al. | |
| 2014/0043972 A1 | 2/2014 | Li et al. | |
| 2014/0050223 A1 | 2/2014 | Foo et al. | |
| 2014/0064281 A1 | 3/2014 | Basso et al. | |
| 2014/0201375 A1 | 7/2014 | Beereddy et al. | |
| 2014/0269705 A1 | 9/2014 | DeCusatis et al. | |
| 2014/0328206 A1 | 11/2014 | Chan et al. | |
| 2015/0010001 A1* | 1/2015 | Duda | H04L 45/74 |
| | | | 370/392 |
| 2015/0010002 A1* | 1/2015 | Duda | H04L 45/74 |
| | | | 370/392 |
| 2015/0124817 A1 | 5/2015 | Merchant et al. | |
| 2015/0127797 A1 | 5/2015 | Attar et al. | |
| 2015/0169351 A1* | 6/2015 | Song | H04L 12/4641 |
| | | | 718/1 |
| 2015/0172190 A1* | 6/2015 | Song | H04L 12/4641 |
| | | | 370/390 |
| 2015/0222543 A1* | 8/2015 | Song | H04L 12/4641 |
| | | | 370/392 |
| 2016/0036697 A1* | 2/2016 | DeCusatis | H04L 45/52 |
| | | | 370/392 |
| 2018/0276013 A1* | 9/2018 | Chandrashekhar | H04L 45/741 |

OTHER PUBLICATIONS

International Search Report and Written Opinion dated Feb. 18, 2015, issued in Application No. PCT/US14/63568.
Khaanabish, et al., "Mobility and Interconnection of Virtual Machines and Virtual Network Elements; draft-khasnabish-vmmi-problems-03.txt," Network Working Group, Dec. 30, 2012, pp. 1-29.
Narten, et al., "Problem Statement: Overlays for Network Virtualization," draft-ietfnvo3-overlay-problem-statement-04.txt11, Internet Engineering Task Force, Jul. 31, 2013, pp. 1-24.
Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.
Chandy, K. Mani, et al., "Distribution Snapshots: Determining Global States of Distributed Systems," ACM Transaction on Computer Systems, Feb. 1985, vol. 3, No. 1, pp. 63-75.
Kodialam, Murali, et. al, "Dynamic Routing of Locally Restorable Bandwidth Guaranteed Tunnels using Aggregated Link Usage Infor-

(56) References Cited

OTHER PUBLICATIONS mation," Proceedings of IEEE INFOCOM, 2001, vol. 1, pp. 376-385.
Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.
Pan, P., et. al, "Fast Reroute Extensions to RSVP-TE for LSP Tunnels," RFC-4090. May 2005, pp. 1-38.
Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

\* cited by examiner

FORWARDING TABLE (AT LEAF)

| Identifier<br>A02 | Adjacency Pointer<br>A06 | Number of Paths<br>A04 | Physical Port<br>A08 | Class<br>A10 |
|---|---|---|---|---|
| VNID, IP | | | | |
| VNID, MAC | | | | |
| | | | | |
| | | | | |
| | | | | |

*FIG. 5A*

ADJACENCY TABLE (AT LEAF)

| VNID<br>B04 | MAC<br>B06 | ENCAP PTR<br>B08 | CTRL<br>B10 | Physical Port<br>B12 |
|---|---|---|---|---|
| | | | | |
| | | | | |
| | | | | |
| | | | | |
| | | | | |

*FIG. 5B*

ENCAPSULATION TABLE (AT LEAF)

| Address<br>C04 | Physical Port<br>C06 |
|---|---|
| | |
| | |
| | |

*FIG. 5C*

MAPPING TABLE (AT SPINE)

| Identifier D02 | | | |
|---|---|---|---|
| VNID D08 | MAC or IP address D06 | Address type D10 | Locator D04 |
| | | | |
| | | | |
| | | | |

*FIG. 5D*

LAYER 2 PROXY MAPPING TABLE (AT PROXY)

| Identifier E02 | | |
|---|---|---|
| VNID E06 | MAC E08 | Locator E04 |
| | | |
| | | |
| | | |

*FIG. 5E*

LAYER 3 PROXY MAPPING TABLE (AT PROXY)

| Identifier F02 | | | |
|---|---|---|---|
| VNID F06 | IP address F08 | Address type F10 | Locator F04 |
| | | | |
| | | | |
| | | | |

*FIG. 5F*

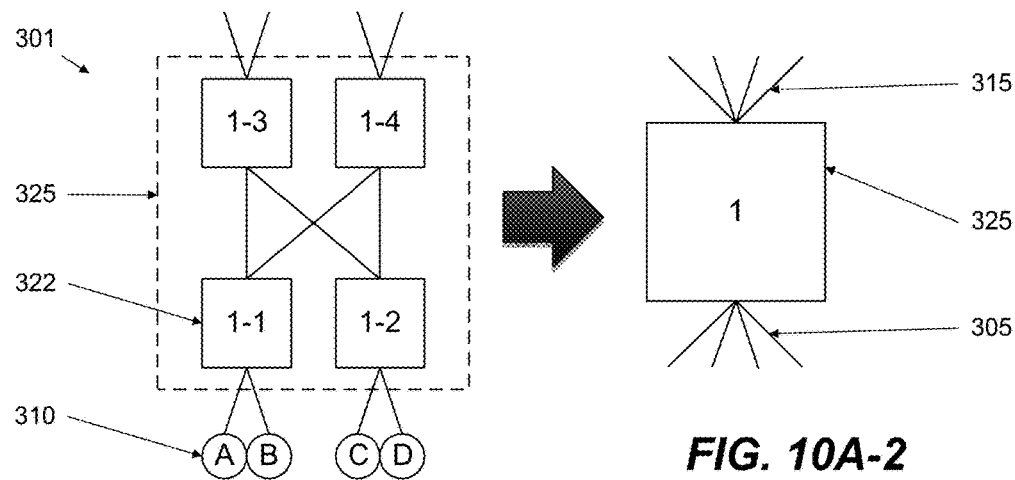
FIG. 10A-1
FIG. 10A-2
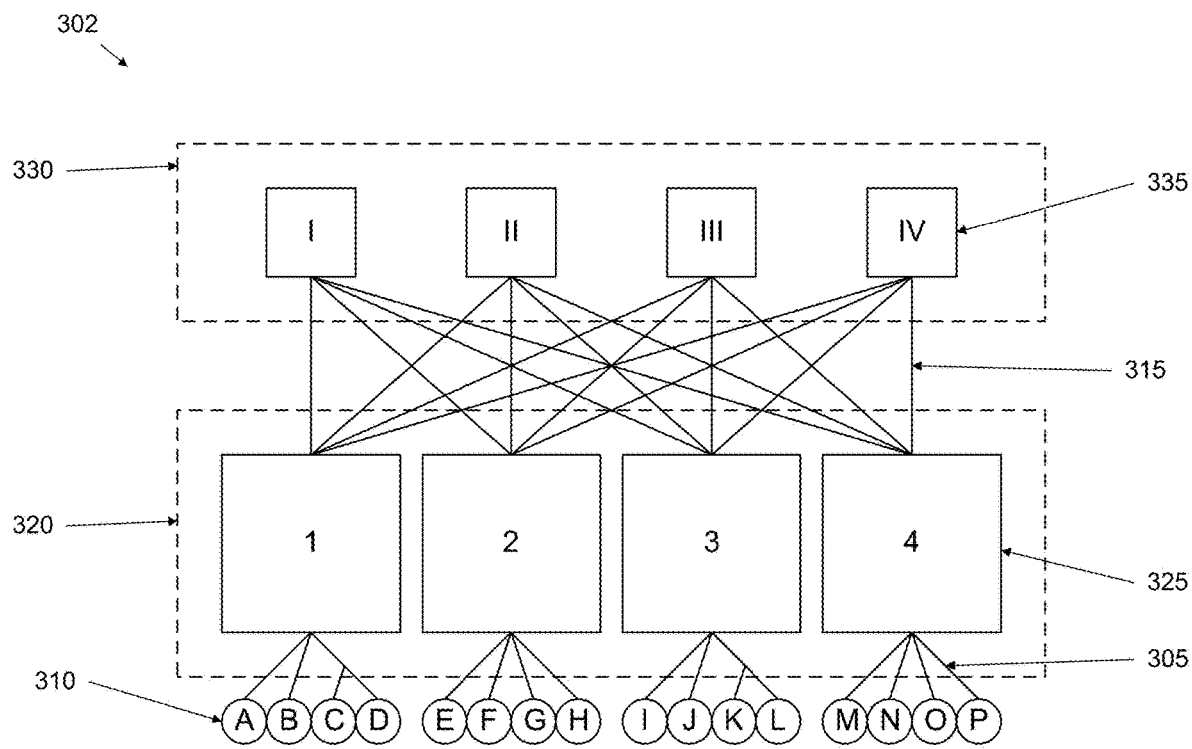
FIG. 10B

NETWORK FABRIC OVERLAY

CROSS-REFERENCE TO RELATED APPLICATION

This application is a continuation of U.S. patent application Ser. No. 14/530,550 filed on Oct. 31, 2014, which claims priority to U.S. Provisional Patent Application Ser. No. 61/900,228 filed on Nov. 5, 2013, the contents of which are incorporated by reference in their entireties.

BACKGROUND

An overlay based on, e.g., VXLAN (Virtual Extensible LAN), may be used to virtualize a network's physical infrastructure. An overlay requires the data path at the edge of the network to map from the Tenant end-point address in the packet, a.k.a. its "identifier," to the location of the end-point, a.k.a. its "locator". This mapping occurs in a function that may be referred to as a "Tunnel End-Point" or TEP.

The challenge of with this mapping is how to scale it for very large, high performance data centers. The first problem with scale is that this mapping state must exist in a large number of locations or TEPs. The mapping must be done in every TEP where an end-point exists that wants to send a packet across the network to another end-point. Potentially, this is at every ingress point in the network.

The second problem with scale is that when an end-point moves, i.e. its locator changes, the mapping state must be updated across the network in all TEPs that have that mapping.

One typical solution is to propagate the mapping to all the TEPs all the time, including changes. A variation on this is to pull the mapping state from a centralized database when it is needed triggered by an exception in the TEP. This latter approach typically has some difficulty in handling end-point movement, i.e. the mapping being out-of-date. Both of these solutions suffer from scale limitations imposed by the central entity that holds the authoritative database of all mappings. It either has too much latency, not enough capacity, or is too expensive. Another issue with this kind of implementation is that it can be difficult to push state to a large number of locations reliably. In large systems, it is almost guaranteed that some failures will occur when pushing the state and then the system has to deal with inconsistent state.

Another approach is to utilize layer 2 semantics and do a "Flood and Learn" where packets that are addressed to end-points whose identifier to locator mapping is not known at the ingress TEP are flooded to all egress TEPs where the end-point may exist. The locator to identity mapping of the source of the tunneled packet is then learned at the egress TEP so that subsequent traffic in the reverse direction does not have to be flooded. This solution has the problem that flooding behavior is generally considered to be very bad because of packets being sent to devices that do not want to see them, and it does not nicely support routing semantics in the fabric because you would not want to flood across a router. In addition, this solution does not address the problem with an end-point moving and the previously learned state being out of date.

SUMMARY

Disclosed herein are methods of forwarding packets on a network, such as a leaf-spine network having leaf devices and spine devices. In some embodiments, the methods include receiving a packet at an ingress leaf device, and determining based, at least in part, on a header of the packet whether the packet is to be transmitted to a spine device. In some embodiments, the methods may further include ascertaining based, at least in part, on a header of the packet whether to perform encapsulation on the packet, and encapsulating the packet according to a result of the ascertaining. In some embodiments, after encapsulating the packet according to the result of the ascertaining, the methods may further include transmitting the packet to a spine device according to a result of the determining.

In some embodiments, the methods may include determining whether the device from which the packet is received is a trusted device, and in certain such embodiments, the foregoing ascertaining is based, at least in part, upon whether the device is a trusted device. In some embodiments, the foregoing encapsulating is performed, at least in part, by the leaf device. In some embodiments, the methods may further include selecting one of two or more spine devices, and the foregoing transmitting includes sending the packet to the selected spine device. In some embodiments, the methods may further include obtaining an identifier of a destination device to which the packet is addressed from a header of the packet, and determining by the leaf device that it does not have a location of the destination device. In certain such embodiments, the encapsulating is thus performed such that a header of the packet identifies one or more proxies, and wherein transmitting the packet includes transmitting the packet to at least one of the one or more proxies.

In some embodiments, the methods may include receiving the packet at an egress leaf device after being sent from the spine, and adding the packet's source identifier and source locator to a forwarding table associated with said egress leaf device when said source identifier and source locator are not already present in said forwarding table. In some embodiments, the methods may include adding the packet's source identifier to a forwarding table associated with the ingress leaf device when said source identifier is not already present in said forwarding table.

In some embodiments, the methods may include sending the packet from the ingress leaf device to the spine, and after receipt at the spine and when the packet's destination locator is set to the proxy address, looking up the packet's destination identifier in a forwarding table associated with the spine to determine the destination locator corresponding to said destination identifier. In certain such embodiments, such methods may further include replacing the proxy address in the packet's header with said destination locator after the determining of said destination locator. In some embodiments, the packet's destination identifier is indicative of the VNID associated with the end device which generated the packet. In some embodiments, one or more forwarding tables associated with the spine contain entries matching end device identifiers with end device locators, the locators indicative of a leaf device a given identified end device is connected to, but wherein said one or more forwarding tables associated with the spine do not contain information listing which port or ports of said leaf device connect to said identified end device.

In some embodiments, the methods may include setting the destination locator field of the packet's encapsulation to be a proxy address when the ingress leaf device does not have an entry in its forwarding table corresponding to a received packet's destination identifier. In some embodiments, the proxy address used to set the destination locator field of the packet's encapsulation is selected from several possible proxy addresses based on a characteristic of the received packet. In certain such embodiments, the proxy address used to set the destination locator field of the packet's encapsulation is selected to be a proxy address for layer 3 packets when the received packet is a layer 3 packet, and a different proxy address for layer 2 packets when the received packet is a layer 2 packet. In some embodiments, the encapsulation applied at the ingress leaf device may include a class indicator field, and wherein the class indicator field may be set by said ingress leaf device based on a characteristic of the packet. In certain such embodiments, a forwarding decision may be made by one or more leaf and/or spine devices based at least in part on the value of the packet's class indicator field.

Also disclosed herein are network apparatuses which include a processor and a memory, at least one of the processor or the memory being configured to perform some or all of the foregoing described methods. In some embodiments, at least one of the processor or memory may be configured to receive a packet at a leaf device, determine based, at least in part, on a header of the packet whether the packet is to be transmitted to a spine device, ascertain based, at least in part, on a header of the packet whether to perform encapsulation on the packet, encapsulate the packet according to a result of the ascertaining, and after encapsulating the packet according to the result of the ascertaining, transmit the packet to a spine device according to a result of the determining.

BRIEF DESCRIPTION OF THE DRAWINGS

FIG. 5A is a diagram illustrating an example forwarding table that may be maintained by leaf devices in accordance with various embodiments.

FIG. 5B is a diagram illustrating an example adjacency table that may be maintained by leaf devices in accordance with various embodiments.

FIG. 5C is a diagram illustrating an example encapsulation table that may be maintained by leaf devices in accordance with various embodiments.

FIG. 5D is a diagram illustrating an example mapping table that may be maintained by a spine device, proxy, or mapper in accordance with various embodiments.

FIG. 5E is a diagram illustrating an example layer 2 proxy mapping table that may be maintained by a proxy device in accordance with various embodiments.

FIG. 5F is a diagram illustrating an example layer 3 proxy mapping table that may be maintained by a proxy device in accordance with various embodiments.

FIGS. 10A-1, 10A-2, and 10B schematically illustrate an example of a 3-tier leaf-spine network built from 4-port switches.

DETAILED DESCRIPTION

Figure 1:
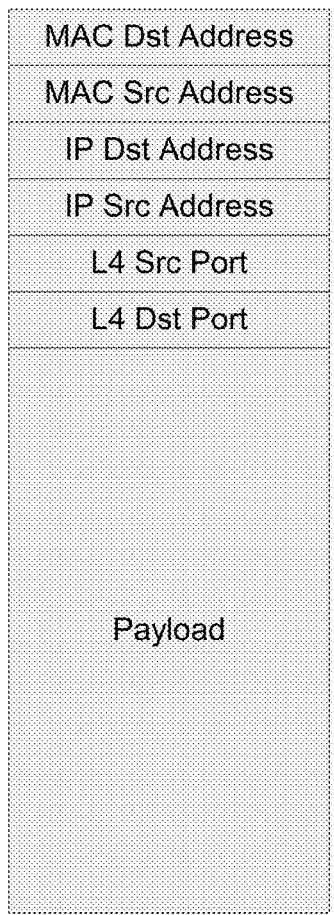
FIG. 1 schematically illustrates the format of an TCP/IP packet.

I. Overlay and Encapsulation Context and Overview

A. Introduction

One of the major challenges associated with implementing a large-scale overlay network in very large, high performance data centers involves scaling of the database which provides the identifier/locator mapping function. Some embodiments disclosed herein utilize a combination of a centralized database of the mappings implemented in the packet data path, at line rate, coupled with a caching mechanism, again in the data path, at the tunnel end-point. In some embodiments, such an overlay network may support extremely large topologies, more than a million end-points, minimal real-time software intervention, and near instantaneous response to moves and changes.

As described in detail below, in some embodiments, the components of such an overlay network may include an overlay encapsulation frame format, one or more types of network devices, a mapping database, a proxy function, a mapping cache, and a protocol for maintaining the mapping database (e.g., the COOP protocol).

The network devices serving as components of the physical infrastructure (apparatus(es)) making up the overlay network may include one or more processors/processing units/modules, one or more memories/memory units/modules, and multiple ports for connecting to and sending data to and/or from other network devices, as well as the end devices which connect to the overlay network. The one or more processors employed in these network devices may be, for example, general purpose CPUs running software implementing various network functions, application specific integrated circuits (ASICs) wherein various network functions are implemented in hardware, some combination of the foregoing, etc., as is appreciated by one of skill in this art. Likewise, the end devices which connect to the overlay network may be any type of computer device which may generally be connected to a computer network, as also appreciated by one of skill in this art.

In some embodiments, the foregoing network devices which form the physical infrastructure of the overlay network may be leaf network devices and spine network devices. Leaf and spine devices are linked in a fabric representing one type of physical infrastructure and network topology on which an overlay network may run. A later section presents various aspects of leaf-spine topologies. Thus, many of the features described in this and subsequent sections pertain to a leaf-spine network topologies. It should be appreciated, however, that an overlay network may also be implemented on other network topologies and/or employing other types of network devices, and so many aspects of this disclosure also pertain more generally to whatever physical infrastructure and topology happen to be used to implement an overlay network.

Certain disclosed embodiments use a combination of a centralized mapping database in spine network devices and a mapping cache in the leaf network devices to obtain good performance and scale. Relevant components of this solution may include: a global/centralized mapping database located in (or locally accessible to) the spine devices which is used in the packet forwarding process when there is a miss in the mapping cache local to the leaf device having received the packet (upon ingress to the network). In some embodiments, the global/centralized mapping database is accessed via a proxy address applied to the packet at the relevant leaf device.

Certain embodiments employ a bounce function that will handle end-point moves. Packets sent to a leaf that used to be the location where an end-point was attached are "bounced" to the correct location. This allows the cached copy of the mapping database to be out of sync and not cause any forwarding problems.

This approach provides excellent scale and performance. It handles end-point moves with a minimum of updates to nodes in the system. It controls the cost of the leaf devices by caching only the part of the mapping database that is actively being used by the leaf devices.

Among the benefits of overlay networks are efficient implementation of workload mobility and workload anywhere. Workload mobility is the ability to move a server or other end device from one place to another place on the network without disruption. For example, a server A initially may be attached to a first leaf device. Later server A is moved to a second leaf device. The identity of server A is preserved during the move, but its location has changed. Workplace mobility allows the network to adapt to this move and provide connections to server A at its new location on the network, sometimes without dropping a connection. Workplace anywhere is a related concept. It is the ability of a network to provide network services to an end device no matter where that end device is attached to the network and for a given workload or application to be deployed anywhere on the network without consideration of the topology of the network.

The concept of workplace mobility is frequently explained in the context of switch maintenance. During maintenance, an attached physical server remains in place while an associated virtual server is moved to a different switch. While the virtual server is moved, all its TCP connections remain intact. The TCP connections are identified by the operating system by the IP and layer 4 addresses.

Flow is also maintained during workplace mobility.

A flow can be any collection of packets that have something in common and that can be identified by fields in the packets. The flow can be as specific or general as desired but usually identifies a connection between a pair of devices. TCP or UDP packets corresponding to a connection between a pair of devices are the most common types of flows.

Such a flow may thus be identified and defined by the following 5-tuple:
1. IP SA (source address)
2. IP DA (destination address)
3. L4 S port (layer 4 source port)
4. L4 D port (a well know port number for protocol running on the connection)
5. TCP or UDP The L4 S port is generally chosen by the server initiating the connection from a range of values, the range depending on the implementation of the networking stack in the initiating server. In some cases, there may be multiple L4 S port numbers assigned for the same two devices communicating using the same protocol. The multiple L4 S port numbers identify different flows allowing for multiple parallel communication channels/flows to improve performance (e.g., node A is accessing a web server B and A opens 4 connections with B to improve performance, each having a distinct L4 S port number).

In conventional networking, an IP address provides both an identity and a location. Historically, this duality did not matter. Servers did not move much. In modern networks servers move, and when this happens, the network may attempt to continue to send packets to the old location, not the new location.

Various protocols have been devised for separating location from identify. Examples include LISP (locator/identifier separation protocol—Cisco supported) Fabric Path, VXLAN (proposed by Cisco, VMware, and others and supported by much of the industry), NVGRE (supported by Microsoft), and STT (stateless transport tunneling—proprietary to VMware).

Each of these protocols separates location from identity. When using such protocols, an end device can communicate with a another device based on identity (a specified IP address) and the network can deliver the packet based on location. Each of these protocols has its own distinct type of overlay and frame encapsulation. For convenience in the following discussion, VXLAN will be described. Unless otherwise noted, the described concepts can apply to other forms of encapsulation.

B. VXLAN/iVXLAN Packet Encapsulation Protocol

A TCP packet as created by a host or other network attached device includes the following components, as shown in Table I and FIG. 1:

TABLE I

| TCP/UDP Ethernet Packet Format | |
|---|---|
| L2 | Destination MAC Address ("L2DA") |
|  | Source MAC Address ("L2SA") |
| L3 | Destination IP Address ("IPDA" or "L3DA") |
|  | Source IP Address ("IPSA" or "L3SA") |
| L4 | Source Port ("L4SP") |
|  | Destination Port ("L4DP") |
| Payload | Application Data |

Figure 2:
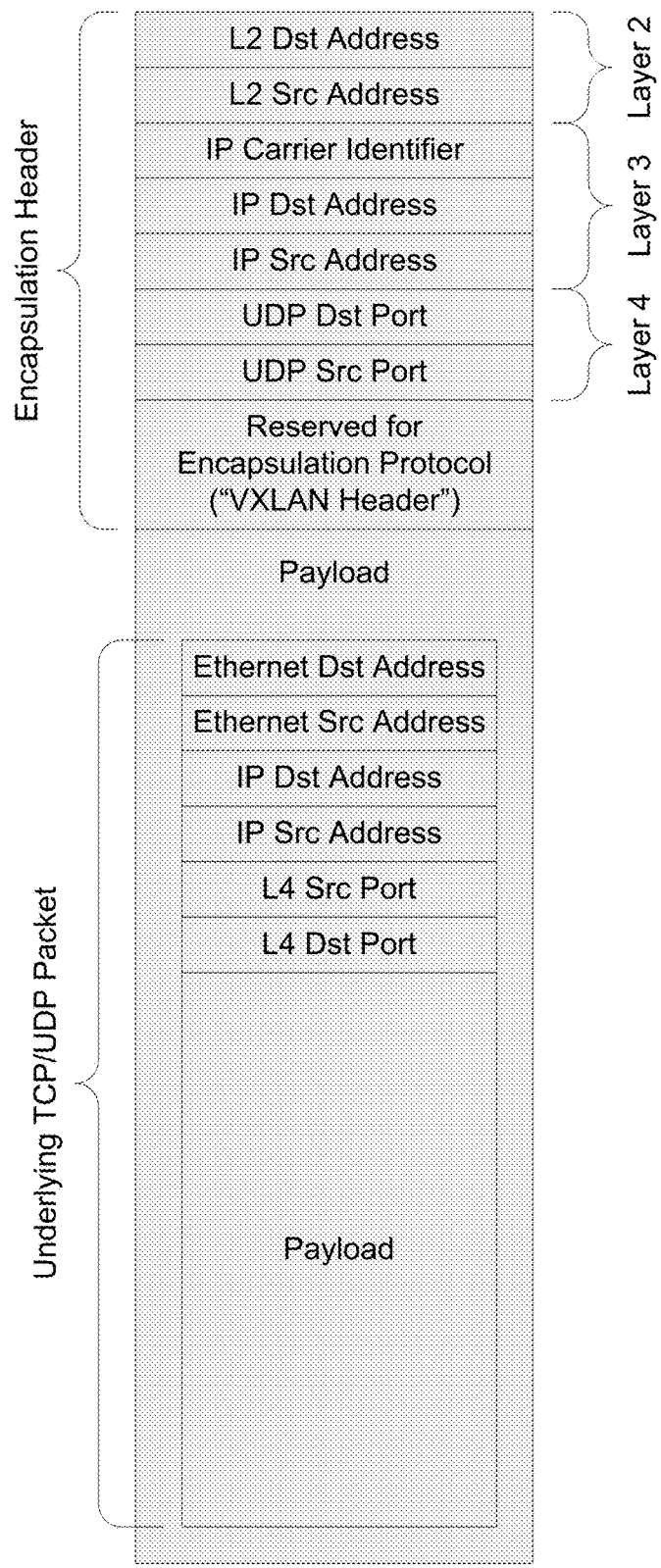
FIG. 2 schematically illustrates the format of a VXLAN encapsulated ethernet packet.

VXLAN encapsulates an ethernet packet by putting a wrapper around it, specifically, the original packet is wrapped in an outer encapsulating packet which employs UDP and VXLAN as the encapsulating protocol. The outer packet/wrapper basically consists of a new header, and the original Ethernet packet is then carried as the payload of the new encapsulating packet with the new VXLAN header. FIG. 2 provides an example where the original, or underlying, packet is a TCP or UDP packet (however, generally any ethernet packet may be encapsulated as such). As shown in FIG. 2, the new encapsulation header includes an IP header (L3) containing an IP destination address and an IP source address, a UDP header (L4) containing an L4 source port and L4 destination port, and finally a VXLAN header that carries VXLAN specific information. It has a layer 2 header as well. The payload of the outer/encapsulating packet is the original underlying ethernet packet, such as a TCP or UDP packet (or technically the original L2 packet containing the TCP or UDP packet). For complete details, see IETF draft, updated Oct. 17, 2013 (VXLAN: A Framework for Overlaying Virtualized Layer 2 Networks over Layer 3 Networks draft-mahalingam-dutt-dcops-vxlan-05.txt), which is incorporated herein by reference in its entirety. A breakdown of the fields present in a VXLAN encapsulation is as follows in Table II, again, as shown in FIG. 2:

TABLE II

VXLAN Encapsulation

| | |
|---|---|
| L2 | Destination Address (could be Ethernet, etc.) |
| | Source Address |
| | (IP carrier identifier) |
| L3 | Destination IP Address |
| | Source IP Address |
| L4 | UDP Destination Port (instead of using a well know port address as in conventional L4 packet structures, it identifies VXLAN) |
| | UDP Source Port |
| L4+ | VXLAN Reserved - 32 bits |
| Payload | (underlying TCP or UDP packet) |

Note that in some embodiments the VXLAN encapsulation implies that the embedded network packet is an Ethernet packet, and in such embodiments, this may avoid having to reserve bits to identify the L2 packet format. However, in other embodiments, the VXLAN header may have bits reserved for indicating what kind of packet is carried in the payload.

The L3 source IP address in the encapsulation header (see Table I and FIG. 2) may sometimes be referred to as the "outer source address" or "source locator." Likewise, the L3 destination IP address in the encapsulation header (also see Table I and FIG. 2) may sometimes be referred to as the "outer destination address" or "destination locator." The "outer" modifier simply signifies that they belong to the outer packet header—i.e. they are fields of the encapsulation. The source locator corresponds to the network device (physical or virtual) where the packet is being sent from—typically serving as the packet's ingress point to the overlay network. Likewise, the destination locator is the address of the network device (physical or virtual) where the packet is being sent to—typically serving as the packet's egress point from the overlay network. Analogously, the source address of the underlying ethernet packet carried as payload in the VXLAN encapsulation may be referred to as the "inner source addresses" or "source identifier," and likewise the destination address of the underlying packet may be referred to as the "inner destination address" or "destination identifier." These source and destination identifiers may be Layer 3 IP addresses in the case of the inner/encapsulated packet being an IP packet (such as a TCP or UDP packet, or packets conforming to the ICMP, IGMP, SCTCP, RCP protocols), or they may be layer 2 MAC addresses if the packet is not an IP packet (e.g., it is a layer 2 packet), or if the packet is an IP packet but is being bridged by the overlay network (rather than routed).

The VXLAN encapsulation scheme/protocol includes a reserved field referred to (perhaps slightly confusingly) as the "VXLAN Header." See FIG. 2. The VXLAN Header contains information specific to the VXLAN protocol. In some implementations, a 24-bit "virtual network ID" (VNID) field of the VXLAN Header is used to identify virtual networks. Thus, a single physical network (e.g., based on a leaf/spine fabric) using VXLAN encapsulation can support over 16 million virtual networks. This is similar to the VSID (virtual segment identifier) field in the NVGRE encapsulation protocol. More generally, the VNID field carried in the VXLAN Header represents one of three possible things: the Virtual L3 context or VRF ("virtual routing and forwarding") for this packet, the bridge domain or BD for this packet, or the End-point group or EPG of the packet. The EPG meaning is only used when doing the policy proxy function or certain types of service insertion and in some cases when communicating with devices external to the fabric that need to signal the EPG using a VXLAN header. The VNID specifies the layer 3 forwarding context or VRF when the packet is routed, and the layer 2 forwarding context or BD when the packet is bridged.

In some embodiments, a "VXLAN header," in addition to having a VNID subfield, may also contain the other subfields shown in Table III each containing information about the packet as described in the table. In some embodiments for instance, when VXLAN is used in end systems such as a TEP embedded within a hypervisor virtual switch, the switch may support the VNID, Source Group, Source Policy Applied, and Destination Policy Applied bits shown in Table III.

Note that the VXLAN packet format is a superset of the LISP packet format [LISP] and also aligns with the OTVv2 packet format [OTVv2], and that prior to the submission of VXLAN, the packet encapsulation was submitted to the IETF as L2 LISP. Differences between the VXLAN draft and the L2 LISP draft include the optional usage of the already declared LISP header fields. The Nonce and Locator Status Bit fields are the most notable LISP header fields that this would apply. Since these bits are used in LISP to signal end-to-end information, a VXLAN header used in an overlay network may leverage the L2 LISP draft but use the Nonce and LSB fields in a proprietary manner. See Table III.

Referring again to Table III: The Source Group field is a 16-bit field in the reserved portion of the VxLAN header (as shown in the table) that is used to carry source classification information from the ingress TEP to the egress TEP. It is used when applying policies to the packet. The destination classification is assumed to be derived locally in the leaf device: optionally on ingress and always on egress, i.e. the destination classification is not carried in the packet.

Also shown in Table III are the "Source Policy Applied" (SP), "Destination Policy Applied" (SP), and the "Forwarding Exception Seen" (E) fields. The SP and DP bits are used to indicate that polices have already been applied to the packet and should not be applied again. If the ingress TEP is able to apply the network policies before sending the packet into the network, it will set these bits so that the egress TEP does not re-apply them. When there is a cache miss, it is possible that the network policies cannot be fully applied at the ingress TEP because the destination class is not known. In this case, the egress TEP must apply those policies. The egress TEP knows that it must apply the policies by looking at the SP and DP bits in the header. The E bit indicates that a forwarding exception has occurred. It is normal for forwarding exceptions to occur in the network. This bit is simply used to prevent multiple forwarding exceptions to occur on the same packet to prevent potential loops. When a packet is sent to the proxy, the Spine that performs the proxy function should set this bit if it was not already set. If the bit was already set, the Spine should drop the packet.

TABLE III

Subfields of the VXLAN Header Field

| Bits | Name | Description |
|---|---|---|
| 1 | Nonce (N) | Indicates the presence of the LISP Nonce field. When set, it indicates that the LISP Nonce bits are used in accordance with this specification. |
| 1 | Locator (L) | Indicates the presence of the Locator Status Bits field. When set, it indicates that the Locator Status Bits are used in accordance with this specification. |

TABLE III-continued

Subfields of the VXLAN Header Field

| Bits | Name | Description |
|---|---|---|
| 1 | Instance (I) | Indicates the presence of the VXLAN Network ID (VNID) field. When set, it indicates that the VNID field is valid. |
| 1 | Don't Learn (DL) | This field is only valid for packets with the Nonce (N) bit set. When set, it indicates that the receiving TEP should not learn the inner source address to outer source TEP address binding. |
| 1 | Forwarding Exception Seen (E) | This field is only valid for packets with the Nonce (N) bit set. When set, it indicates that the packet has experienced a forwarding exception such as fast rerouting or bounce. If already set, and another forwarding exception occurs to the packet, the packet will be dropped to avoid forwarding loops. |
| 1 | Source Policy Applied (SP) | This field is only valid for packets with the Nonce (N) bit set. When set, it indicates that the source EPG-based policy (i.e. ingress security ACL) has already been applied. This is set when the packet is returning from a policy proxy back to the original ingress switch. The original ingress switch will use this bit to determine whether or not to skip the ingress source EPG-based policy. It may also be set by a vLeaf that applies all of the applicable source policies to the packet. |
| 1 | Destination Policy Applied (DP) | This field is only valid for packets with the Nonce bit set. When set, it indicates that the destination EPG-based policy (i.e. egress security ACL) has already been applied. This is set when the packet is returning from a policy proxy back to the original egress switch. The original egress switch will use this bit to determine whether or not to skip the egress destination EPG-based policy. It may also be set by a vLeaf that applies all of the applicable destination policies to the packet. |
| 16 | Source Group | This field is only valid for packets with the Nonce (N) bit set. It indicates the EPG of the endpoint that sourced the original packet. |

Furthermore, in some embodiments, in order to help mitigate some of the risk associated with implementing a currently evolving industry standardization effort in hardware, ASICs implementing VXLAN may, as a precaution, advantageously utilize a programmable register to set the destination UDP port for VXLAN.

Trusted and untrusted systems will be discussed in greater detail below, however, with regards to details of the VXLAN header, it is noted that only trusted systems may have the ability to set the following bits since they directly affect the security policy that is applied: Source Group, Source Policy Applied, and Destination Policy Applied bits.

In further discussion, for convenience, the description of VXLAN encapsulation will be abbreviated, and unless otherwise indicated the discussion that follows applies to VXLAN and iVXLAN (iVXLAN being a variation/subtype of VXLAN). Often, the parts that are most relevant are the source and destination IP addresses. Note that other forms of location/identity separating overlays may be used in place of VXLAN.

C. Hashing to Distribute Flows

In conventional network protocols, a technique is used to ensure that all packets of a given flow take the same network path. By following the same path, the packets cannot pass one another and are guaranteed to arrive in order, i.e., in sequence they were sent. Additionally, conventional protocols attempt to spread flows around the network to load balance. If two paths are available, a network may strive to direct half the flows to one path and the other half to the other path.

Networks statistically approximate an even distribution of flows by hashing the flows based on packet information that uniquely defines the flows. For example, when the network encounters a packet, it may apply a hash function on the portion of the header defining the flow. In other words, it may apply the hash function on the 5-tuple (L3DA, L3SA, L4DP, L4SP, protocol type) (see Table I above). The hash function returns a value identifying which of the available network paths is used for the flow.

As is well understood, the hash function is a mathematical operation that takes as input a relative large number of bits and outputs a value in a smaller number of bits. It is also well known that a hash function is deterministic: it always returns the same output for a given input. As an example, the header of a TCP packet may be hashed to produce a three bit output. That output specifies which of, e.g., 8 network paths to direct the flow.

In some network contexts, it is possible for the VXLAN packet encapsulation fields used to identify a flow will have identical values for multiple flows. There will be multiple flows with the same destination and same source, and hence the same hash value. In VXLAN, the L4 destination port is always the same; it identifies VXLAN. If a given L4 source port in the leaf/spine network is constant, then the hash value will be the same. This may present a problem in a leaf/spine fabric because the traffic will not be well balanced across the available paths. The equipment determining which path a flow should take may not recognize it is handling a VXLAN packet. As such, it simply hashes information from the fields of the VXLAN encapsulation it perceives are part of a conventional UDP or TCP packet. As a consequence, all flows between two tunnel end points on the leaf tier will take the same path through the fabric. For load balancing, it would be desirable to distribute flows between the same source and destination tunnel end points (or end devices) on the fabric across multiple paths in the fabric.

There are many ways to address this issue. In one approach, the network may choose a unique value of the VXLAN L4 source port (a UDP source port) for each encapsulated flow. This allows the leaf/spine network to distribute flows to different network paths on the leaf/spine fabric. One way to accomplish this is by setting the value for the UDP L4 source port based on a function of the underlying flow defined in the non-VXLAN portion of the packet. For example, a leaf network device creating a VXLAN header may hash the values in the underlying TCP or UDP packets that define a flow. These values may be, for example, the entire 5-tuple uniquely defining the flow in the underlying TCP/UDP packet. The resulting hash value is inserted into the UDP L4 source port of the encapsulating header. When a device in the leaf/spine fabric encounters such a packet, it hashes the VXLAN encapsulation fields according to the standard protocol for determining flow paths and obtains an essentially random value that determines the flow path through the leaf/spine fabric. This approach produces a highly entropic distribution of flows in the fabric. The network devices making the forwarding decisions need not understand VXLAN. They simply consider the encapsulation header, which appears to them as a conventional layer 4 packet header.

D. Overlays

VXLAN or other encapsulation may be used to implement an overlay. As an example, a packet is delivered from A to B on the simplified data center leaf/spine network shown in FIG. 3. The network in FIG. 3 has leaf devices L1-L4 and spine devices S1 and S2 as well as end devices A and B. Each of spine devices S1 and S2 connect to all the leaves L1-L4. End device A is connected to leaf device L1 and end device B is connected to leaf device L2.

1. Conventional Approach

The network knows where end device B is located. It examines a packet from end device A and sees that the destination is end device B. To get to B, each network device routes the packet according to its understanding of B's location. However if B moves, at least the spine nodes need to be notified. This suggests a need to separate the identity and location of B. Furthermore, in a conventional network, it may not be possible to relocate B to another part of the network due to placement of IP subnets in the network—i.e. B can only be moved to a location in the network where its subnet exists and often that subnet only exists in a very limited number of locations.

2. Encapsulation Approach

Figure 3:
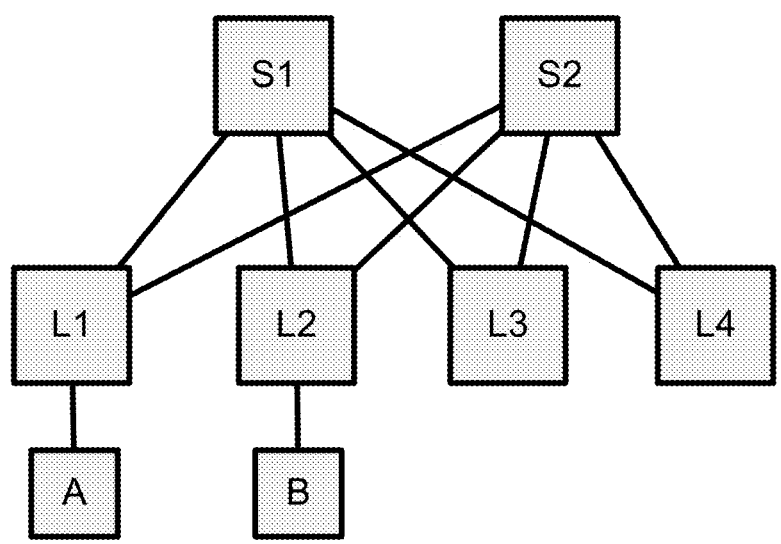
FIG. 3 schematically illustrates a simple example of a leaf-spine network connecting two end devices A and B.

Assume the network shown in FIG. 3 contains a mapping so that the spine devices know which leaf device end device B is attached to. Tables are maintained in the leaf devices' in forwarding logic. In some implementations, these are similar to the forwarding tables maintained in conventional networks. For example, a leaf network device might have a forwarding table including the following information (and much other information) shown in Table IV:

TABLE IV

| Identifier | Location |
|---|---|
| end device B | Leaf L2 |
| end device A | Leaf L1 |

When a packet arrives from end device A that is being sent to end device B, leaf device L1 looks up the location of end device B (which is leaf device L2) and encapsulates the packet. It adds a VXLAN header (to L1 from L2).

Encapsulation allows a network administrator to move end device B around, from one leaf device to another leaf device. In various embodiments, only the leaf device tables are made aware of the details of B's identity. The spine devices S1 and S2 need not know details of the identity. They only need to know where L2 is located on the overlay network. After B is moved, the next packet arriving at L1 and addressed to B is handled differently. L1's updated table instructs it that the current location of B is a different leaf node. With this knowledge, L1 applies an encapsulation header that identifies the new location of B.

This process has effectively separated each end device's location from identity. The individual spine devices and end devices need not know the details of B's location and identity.

For purposes of this example, VXLAN is only used to deliver the packet through the data center fabric. The encapsulation (or lack of encapsulation) need not be part of any network protocol outside the data center.

3. Conventional Routing and Host Routes

A packet arrives at a router, which knows that it has subnet 1 (e.g., 192.168.*.*) on interface 1 and subnet 2 (e.g., 192.169.*.*) on interface 2. For routing to work efficiently, all nodes connected on the port of interface 2 must be in the 192.169.*.* subnet. If one of these nodes moves, another route needs to be created: e.g., the interface of the router to which the node has moved must now identify not only its original subnet(s) but the IP address of the moved node. This route to the moved host outside the router interface's originally configured subnet is called a host route. As more host routes are created, network efficiency degrades. Many routes need to be tracked and updated frequently.

In overlay routing, very few host routes need be created, so the network performance does not degrade when hosts move between ports on the leaf devices. The spine devices need only keep track of leaf devices which seldom if ever move. Also, the number of leaf devices is small compared to the number of hosts so fewer routes have to be handled in the overlay in general. The overlay encapsulation identifies recipient leaf devices.

It should be understood that layer 2 networks also allow movement of end devices without the penalty of creating host routes. However, layer 2 networks are fragile. They are susceptible to broadcast storms and loops. They do not support unlimited redundant paths. If a layer 3 network is used, an overlay network effectively permits workload anywhere and mobility without the limitations of a layer 2 network.

Note that two virtual networks may share the same subnet in an overlay network. For example there may be a virtual network #1 (say for tenant #1) and a virtual network #2 (say for tenant #2) in the same data center. The two networks may each have the same sub-network (e.g., 192.168.5.*). However, packets addressed to a shared IP address are correctly routed because the overlay network understands (via the packet encapsulation) that the end devices corresponding to the two networks reside on logically separate hardware or logically separate networks. In fact, each set of end devices corresponding to the two networks do not need to know that the other set of end devices (or even the other network exists).

In some implementations, a single leaf/spine fabric using VXLAN encapsulation can have over 16 million networks. The network is identified in a VNID 24-bit field of the VXLAN header.

4. Virtualization and Live-Migration in an Overlay Network

Server Virtualization Via Hypervisors

Server virtualization is employed to make single physical servers appear and function as multiple virtual servers on the network. In many implementations, these server virtual machines (VMs) run atop a piece of software known in the art as a "hypervisor" which sits as a layer of abstraction in between the virtual servers and the underlying physical architecture. Perhaps the most well-known software package providing a hypervisor for server virtualization is produced by VMWare, although other server virtualization packages are provided by other vendors and some are open source.

Typically, through virtualization, a single physical server can support something on the order of 10 or 100 virtual servers running simultaneously. Widespread adoption of virtualization technology is a consequence of the benefits it provides. For example, server operating systems (OSes) may variously provide different technical advantages (and disadvantages), and moreover different server OSes enable the use of different software packages or applications depending on which particular OSes particular software is designed for. Another benefit is that each software application can run on its own virtual server, lowering or eliminating the possibility that individual software applications may conflict with one another when running simultaneously on the same server.

Relatedly, allowing each application (or just a few applications) to run on a dedicated virtual server can result in better management and sharing of the underlying physical resources (RAM, CPU, I/O bandwidth, network bandwidth, etc.) the allocation of which then (in large part) becomes the responsibility of the hypervisor and virtualization software.

Current server hardware architecture typically consists of one or more multiple-core CPUs where, in some cases, each core may concurrently run multiple threads at the hardware level (e.g. Intel's "Hyper-Threading" technology). A server virtualization layer can help to maximize the efficient usage of all these multiple cores and threads.

Finally, it is becoming more commonplace that the end user's local hardware (i.e., their desktop computer) is being replaced by what is often referred to as a virtual desktop infrastructure (VDI). In a typical VDI setup, each end user operates their local keyboard, video display screen, and mouse (KVM) to control—over the network—a desktop environment running remotely on a server in the datacenter. A well-known legacy example of this type of architecture is the X-Windows system typically used in connection with UNIX or UNIX-like (e.g. Linux) OSes. VDIs can result in significant cost savings related to efficient shared hardware utilization, particularly if individual end users typically only use a fraction of the computing resources available on a typical desktop computer. (E.g., only running a word processor, web browser, and e-mail client on a modern CPU, as is commonplace.) Other VDI-related efficiencies relate to differences in system administration costs—e.g., administering 100 virtual desktops running on a single server, sharing applications, etc. versus administering 100 individual physical desktops, local copies of software packages requiring frequent updates, etc.

Thus, due to employment of server virtualization technologies in the modern datacenter as well as the increasingly common replacement of desktop computers with VDIs, there is now often a virtualization layer present in modern computing environments.

Live-Migration

A benefit of an overlay network in a virtualization environment is "live migration" where a virtual server running atop one physical server may be moved to another physical server while the virtual server remains active with all its network connections intact. (Within the context of VMWare's products this is known as VMotion.) The separation of location and identity provided by the overlay network (through encapsulation) enables live migration by allowing each virtual server to retain its identity—its assigned IP address as viewed from outside the overlay network—despite its physical location within the fabric of the overlay having changed from one physical server to another.

Thus, the actual transfer of a virtual server from one physical server to another—while keeping all its live connections intact (i.e., in the context of a "live migration" or VMotion, etc.)—may be executed as follows: The network connection between the two physical servers is used to copy and transfer the memory contents (data and instructions) of the original physical server which are relevant to the virtual server being transferred to the new physical server. After this initial copy/transfer is completed, subsequent copies may be executed between the two physical servers to copy the memory contents of the original physical server which have changed since (or during) execution of the previous copy. This updates the copy of the virtual server on the new machine—done because the virtual server being transferred continues to operate on the original physical server during the copying process. Thus, subsequent copying may have to be performed multiple times until the remaining differences are so small, and the copy operations rapid enough, that the virtual server may finally be taken offline for one last copy operation to the new physical server, and then a full copy of the virtual server on the new physical server may be "awakened," to replace its predecessor with all network connections, program applications, etc. intact. When the virtual server wakes up running on the new physical server, it typically sends a gratuitous ARP. The network now knows that the virtual server is at a new location and the old virtual server is destroyed.

Live migration functionality is very useful because of the flexibility it provides in the datacenter. For example, the technology allows a physical server to be taken down for maintenance or replaced while the virtual servers it is supporting may be seamlessly transferred to another physical server thereby providing uninterrupted service. In a more complicated scenario, virtual servers may be periodically redistributed across the physical server infrastructure for purposes of load balancing virtual sever utilization of this infrastructure.

E. Brief Overview of the Mapping Database

The mapping database is a database maintained by the fabric which contains the mapping from an "identifier" associated with each end-point attached to the network to each end-point's "locator"—the address of the tunnel endpoint that the end device sits behind. The endpoint address may be either the MAC address or the IP address of the end-point plus the logical network that it is in (BD or VRF). A particular end-point IP address may be associated with multiple TEPs. This would be an example of an "anycast" identifier address.

The mapping database is populated when end-points are discovered in the network. This discovery happens either through static configuration, first packet arrival, or notification from external controllers such as a network orchestration tool. In any case, the leaf devices are responsible for communicating this discovery to the spine devices through the COOP or LISP control protocol.

The spine devices keep a soft copy of the mapping database and also program the proxy function based on this database.

When an ingress leaf device forwards a packet, it checks its local cache of the mapping database. If it does not find the end-point address it is looking for, it will encapsulate the packet to the proxy function residing in the spine. The spine, upon receiving a packet addressed to its proxy function will look up the destination identifier address in its forwarding tables that contain the entire mapping database. Based on the result, it will re-encapsulate the packet to the correct destination locator while retaining the original ingress source locator address in the VXLAN encapsulation.

When the packet is received from the fabric by the egress leaf device it will check its local cache of the mapping database and update the cache according to what is contained in the packet. It will then remove the encapsulation and forward the packet to its final destination.

In summary, the mapping database contains the mapping from end device identifiers to end device locators. It is populated through end device discovery as said devices attach to the network, static configuration, and/or an external controller. Finally, the mapping database is held in the spine devices (or another device associated with the spine) in some embodiments and, generally, it is cached in the leaf devices.

F. Division of Packet Forwarding Responsibilities Between Leaf and Spine Devices in a VXLAN Leaf-Spine Fabric Overlay Network A simple example of a network having a leaf-spine topology has already been shown in FIG. 3. This simple network consisted of 2 spine devices S1 and S2 and 4 leaf devices L1, L2, L3, and L4.

In a simple view, the leaf spine fabric can be logically divided by a line through the leaf devices to separate the end devices and their corresponding leaf device ports from the spine devices and their corresponding leaf device ports. Packets flowing across this logical line into the fabric are encapsulated. Packets flowing across the line out of the fabric are de-encapsulated. In a more detailed view, the overlay network boundaries are defined by tunnel end points, some of which may exist outside the leaf devices. This more detailed view of overlay network boundaries is presented below.

In addition a more detailed explanation of leaf-spine topology is provided further below, however, the following two subsections provide a brief overview of the roles leaf devices and spine devices may serve in the context of an overlay network.

1. Overview of Leaf Devices and their Responsibilities in a Logically Divided Network Leaf network devices ("leaf devices," for short) sit at the edge of the fabric overlay serving as ingress and egress points from the overlay network, and accordingly implement the tunnel end-point (TEP) function (described in detail below). In some embodiments, they are also responsible for routing or bridging tenant packets as well as applying network policies. In some embodiments, the leaf and spine functions may be implemented in the same physical device to optimize certain network scenarios.

As described in greater detail below, network traffic entering and exiting the fabric overlay flows through a leaf device (the spine devices only connect to leaf devices or other spine devices in a different tier of the network). Connections to external networks and to servers and other end points are through the leaf devices. Leaf devices may perform the following functions, in addition to many others, to support the overlay: implementation of the mapping cache, forwarding of packets to the proxy function when there is a miss in the local mapping cache, encapsulation of packets in a VXLAN header, enforcement of network policies at ingress and egress, and implementation of the "citizen" function of the COOP protocol.

The local forwarding table/cache maintained by each leaf network device may contain the MAC and IP addresses of all end devices attached to it. The forwarding table may also contain learned MAC and IP addresses of end devices attached to other leaf devices. Such learned addresses are typically cached and, in some embodiments, ultimately aged out of the forwarding tables.

Collectively, the leaf devices note when an end device moves or when a topology change occurs. In some embodiments, the leaf devices may keep track of when a topology change occurs within the fabric (e.g., one or more links between spine and leaf devices goes up or down) using routing protocols such as ISIS. Alternatives include BGP or OSPF. In some embodiments, the leaf devices may track the connection of new end devices to the network, the removal of end devices from the network, and movement of end devices within the network (e.g., moving a connection from one leaf device to another) using COOP in conjunction with the proxy function described herein. Alternatives to this approach include using BGP or LISP to synchronize information regarding end point connections to the leaf devices, or to employ the typical flood and learn procedure (but at the penalty of flood and learn's inherent inefficiencies). However, in some embodiments, the leaf devices do not propagate end point connection information to one another directly, but instead they notify the spine network devices of end-point discovery. Caching mechanisms then update the other leaf devices as needed as described in detail herein.

The leaf network devices also perform packet encapsulation. The spine devices receiving the encapsulated packets, rapidly forward them to other network locations based on the addresses in the encapsulating header. Examples of the forwarding tables will be described below.

2. Overview of Spine Devices and their Responsibilities in a Logically Divided Network Spine network devices (or "spine devices" or just "spines,", for short) connect the leaf devices. Typically, however, spine network devices are not directly connected to each other, and nor do they serve as ingress or egress points from the network. However, in networks having multiple tiers of spine devices (as described below) spine network devices in one tier may be connected to spine devices in a different tier. An example of a 3-tier network having 2 tiers of spine network devices (that are interconnected) is described in detail below.

In some embodiments, the spine devices are implemented as Layer 3, IPv4 switches. In a specific example, the spine devices are 40 GB/s Ethernet switches. The spine devices employ the proxy function (described herein) either by hosting it themselves or being associated with a separate device which hosts the proxy function. Thus, associated with the spine devices is a master mapping database (described below) which is used to efficiently route encapsulated packets to the leaf devices making up the fabric. Note that unless specified otherwise, when describing the operation of the spine devices, it is to be assumed that they host the proxy function, or otherwise have accessible the execution of the proxy function when required. Thus, when a packet is received at a spine device, it may check whether the packet's destination locator is a proxy address (in some embodiments, there are multiple such proxy addresses as described below) and, if so, performs the proxy function, replacing the proxy address with the locator address of the TEP associated with the packet's destination, and forwards the packet accordingly. If the packet's destination locator address is not a proxy address, then the spine device simply forwards the packet according to standard and well understood forwarding mechanisms (after lookup of the destination locator address in its forwarding table). Additionally, in many of the embodiments described below, the spine devices also host the "Oracle" component of the COOP protocol.

Additional consequences and benefits of the logical division of packet forwarding responsibilities between leaf and spine devices is that the spine side of the line has relatively few devices. An example of a very large network would have about 500 network devices, including spine and leaf devices. From a routing protocol perspective, this is a small network. By contrast, the end device side of the line might have 20,000 servers—say if there are approximately 500 leaf devices each connecting 40 servers. Moreover, if each of the 40 physical servers supports 10 virtual machines, this gives a network of about 200,000 network addresses. By dividing a data center network in this way, the spine and any interior network devices can run efficiently, without being hindered by detailed information about end device location and connectivity. Significant efficiencies result by dividing the network between a relatively small number of interior network devices which operate very fast and the leaf devices which must keep track of a dramatically larger number of servers or other end devices. In some embodiments, the ratio of end devices to non-leaf interior network devices (e.g. spine devices) is at least about 400:1. Often, the spine and any other interior network devices have very fast interfaces, e.g., about 40 Gigabit/s or faster. Simplified routing permits available hardware and software resources in the spine to focus on performance.

The overlay network and associated encapsulation permit the network to be divided as described. The leaf devices responsible for encapsulation are also responsible for maintaining details about the location and identity of the end devices. Some of this information is masked from the spine devices and any other internal network devices in the fabric. It is masked because the leaf devices encapsulate packets before they forward the packets to spine or interior devices in the fabric. While, the leaf devices may have to be concerned with address information in the underlying packet as well as the encapsulation, while the spine devices typically have to be concerned only with the address information in the encapsulation portion.

In some embodiments, the spine side of the divided fabric runs a routing protocol optimized for small numbers of addresses and the end device side of the fabric runs a routing protocol optimized for a large number of addresses. Some routing protocols are good for handling small numbers of addresses. They rapidly converge. One example is ISIS. Other routing protocols are better at handling large numbers of addresses, although they may not converge as fast. One example is BGP. In one example, the spine side runs ISIS and the external side runs BGP. Regardless of the routing protocols actually selected, one protocol is used to maintain information about end device connectivity and the other protocol is used to control routing within the fabric.

In some embodiments, the spine and interior network devices run only a single protocol. Unlike routers in a conventional network, they need not be concerned with multiple routing protocols. The leaf devices, of course, may have to handle multiple routing protocols.

The logically divided overlay network on this data center has various benefits. First, it provides capacity for a large number of virtual networks. Using the 24 bit field in a VXLAN header as described, the physical infrastructure can support over 16 million virtual networks. Second, the spine backbone can have extremely high performance. It need not devote significant computational resources to routing table upkeep or multiple routing protocols. Third, the network design allows easy separation of location and identity. The leaf devices keep track of location and identity in, for example, mapping database tables as described here. Fourth, the network can be multiprotocol without changing the spine; e.g., the network can support IPv4 and IPv6 or other protocols without the spine needing to support all of those protocols.

3. Bridging-Routing Hybrid Network

Spanning tree is a protocol used to remove potential loops in a layer 2 network. It does this by logically breaking links in the network to create a non-cyclical graph over an arbitrary topology. As a result, it removes all redundant paths and some of the remaining paths are sub-optimal.

Spanning tree would remove much of the value of a leaf/spine topology. The massive path redundancy inherent in the topology would be removed to eliminate potential layer 2 loops. Using layer 3 routing can overcome this limitation. However, unfortunately some network equipment does not use IP (or, for various reasons, is not operated in a mode that supports IP) and therefore cannot generate packets that can be routed. For example, a server may run network software that is incapable of generating IP packets.

Routing can be performed on non IP packets using encapsulation as described above. Routing permits redundant paths between network nodes. So spanning tree is not necessary and network performance is improved. In the implementations described herein, the data center supports layer 2 packets but it uses routing to deliver those packets across the data center fabric. Routing enables multi-pathing. That is, different flows between two end devices can take different paths.

From some perspectives, the data center may appear to be a layer 2 network. For example, the underlying packets (the layer 2 packets that serve as the payload of VXLAN packets) are not modified. They are effectively bridged between leaf network devices when appropriate. The end devices initiating communications on the network may believe they are communicating by bridging at layer 2. They create layer 2 packets having MAC addresses in the headers. They may be unaware that the leaf devices are applying encapsulation to facilitate routing within the leaf/spine network.

This arrangement provides all the benefits of layer 3 networking without interfering with layer 2 networking. The network does not care whether the end devices believe they are bridging or routing.

4. Leaf Node Identifies End Devices Attached to it

Each leaf network device determines and maintains information about the end devices attached to it. It may do this by various techniques. Some of these involve intercepting initial packets from the end device.

First Option: DHCP Request—A leaf device to which an end device attaches, watches for DHCP requests from the end device. When such request issues, the leaf device intercepts the DHCP packet to learn the end device's MAC address. It then relays the request to a DHCP server which issues the IP address and returns it to the leaf device which then learns that IP address before passing the response on to the end device. So the leaf device to which the end device is attached knows both the IP address and the MAC address for the newly attached device.

Second Option: Gratuitous ARP—The end device knows its IP address from some other process (e.g., a VMware process). The server announces its presence on the network by issuing a gratuitous ARP. Leaf devices receiving the gratuitous ARP learn the IP address and MAC address of the end device from the gratuitous ARP packet.

Third Option: Some other packet—The end device issues some other packet containing a source IP and source MAC address.

Fourth Option: Some other non-IP packet—The end device issues some other packet that contains a MAC address, but not an IP address. In this case, the leaf device would learn only the MAC address. If an IP address were to be used by the end device at a later time, the corresponding IP address would be learned at that time.

5. Propagating Network Changes and Maintaining a Mapping Database

By whatever means, a leaf device learns the MAC and IP addresses for the end devices attached to it. The leaf device then updates its local forwarding table with this information.

It is possible that the other leaf devices could have their mapping tables updated via a protocol such as BGP. In implementations described here, the leaf devices do not propagate the information using a traditional routing protocol. Rather they each maintain their own table which includes information for each end device attached to the associated leaf device. The information includes the identity of the attached device and the port to which it attaches.

In some implementations, the leaf devices propagate table information using the Council of Oracles Protocol (COOP) or related protocol. COOP has "citizens" which get information from "oracles" and/or sends information to oracles.

An oracle populates the mapping database with current location-identity information for the overlay network end points. Citizens provide updated information to the oracles, which maintain the master database. Optionally, the citizens query the oracles for information from the master database. In certain implementations described herein, the citizens cache information they learn from the master database but they do not technically query the oracles for this information.

In certain implementations, an oracle exists with a proxy function at one or more spine devices. The leaf device citizens discover end points and changes in end points and report those to the oracles. The protocol may employ a mechanism designating certain oracles as the recipient for certain discovery information about certain end nodes.

In this approach, the spine devices share reported end node information with one another to keep up the complete master database. The spine devices may communicate among themselves using TCP connections. In certain embodiments, the protocol is implemented without encapsulation. For example, the leaf devices may communicate mapping database information to oracles via normal non-encapsulated networking and oracles may synchronize information among themselves via normal, non-encapsulated networking.

In theory, the oracles could sit at locations other than spine devices. For example, they could be implemented in leaf devices or on a separate server. Because there are relatively few spine devices and packets must be forwarded through spine devices anyway, the COOP oracles are conveniently located in the spine devices. The oracle devices (spine devices or otherwise) can serve the proxy function by consulting the mapper function, described elsewhere herein.

In general, transfer mechanisms other than COOP may be employed to maintain and use the master database. The LISP control protocol is another example.

In certain implementations, the leaf devices only propagate newly learned information to the spine. They do not propagate the information to other leaf devices. They inform the spine of the identity of the attached device and the leaf device to which it is attached. They may decide which spine device to tell using a hash function (e.g., by hashing the address of the attached device). Thus, particular spine devices become the masters for particular end devices. As a consequence, in some embodiments, the network is incapable of having inconsistent location information for a particular end device. However, in certain embodiments, the recipient spine device synchronizes the newly learned information with other spine devices. In this way, each device on the spine keeps a full master list of all end devices attached to the leaf tier. In other embodiments, the leaf device will select a spine device at random. That spine device will then send this end-point information to another spine device based on a hash of the address of the end-point that has been discovered, thus effectively accomplishing the same thing as above without the leaf devices needing to determine which spine device to send to.

As mentioned above, local forwarding tables are provided in the leaf devices. Typically these tables are not identical across the various leaf devices. The forwarding tables store the identities of the attached devices (e.g., MAC and IP addresses among other information) and the leaf devices to which they are attached (locators). The forwarding logic associated using these tables may be implemented in hardware. Each table may be relatively small compared to the total number of end devices attached to the network.

The master mapping database is stored in the spine devices. It represents a combination of all the information in each of the leaf tier mapping tables. However, it does not contain details of the end devices such as MAC to IP address bindings. The spine device logic for accessing the mapping database may be implemented in hardware in the spine devices. This table is large enough to have an entry for every attached device (virtual and physical). In some implementations, it may be large enough to support a million entries.

COOP or other similar protocols may allow efficient scaling as the number of leaf devices increases. In some embodiments, the effort to maintain necessary table information increases substantially independently of the number of leaf devices. Instead, in certain such embodiments, the table maintenance effort scales with the number of spine devices, which is typically a manageably small number.

6. Process of Updating the Forwarding Tables and Master Mapping Database—and Proxy Among the pertinent features of the described overlay network are the following:

1. Proxy—Using a proxy destination in the encapsulation when the leaf device receiving a new packet from an attached end device does not know which other leaf device is responsible for connecting the specified destination end device; and 2. Learning—A recipient leaf device learning about end devices on other leaf devices by de-encapsulating packets destined for devices on the recipient leaf. The recipient leaf then updates its forwarding table so that it does not need to use the proxy destination when forwarding packets destined for devices in its table.

An ingress leaf device receives a packet with a destination address. It checks for the address in its forwarding table. If the address is not in its forwarding table, it sends the packet to the proxy. Thus, in certain embodiments, the leaf device simply determines whether the destination is local to it or not. When it is not, the leaf device sends the packet to the proxy, by encapsulating it with a destination locator address of the proxy.

In some embodiments, when the leaf device detects a miss in its local forwarding table, it encapsulates the packet with a destination address that is a proxy. In some implementations, the proxy address is a virtual address shared by all of the spine devices. In one example, there are logically two proxies used by the overlay, one for bridging (MAC address of the destination stays constant as the packet makes its way to the destination) and another for routing (the MAC address changes at either the ingress leaf device or the egress leaf device).

A spine device receiving the packet addressed to proxy will look up the leaf network address for the destination in its copy of the master mapping database. The spine device will then replace the proxy address in the encapsulation header with the locator address of the destination device (its identifier). The leaf device receiving the encapsulated packet will de-encapsulate it and send it to the addressed destination device, which is attached to the recipient leaf device.

Additionally, the recipient leaf device may update its local forwarding table with the source information (identifier and locator) learned from the encapsulated packet. If the forwarding table already contains an entry for the packet's source, it will confirm that the entry has not changed. If necessary, it will update the entry with the new location. As mentioned, the leaf device's forwarding tables store the identity of the devices and the leaf device locators to which they are attached. Below, this document presents a mechanism by which the leaf device may route and bridge packets for ingress and egress on the overlay fabric.

Thus, the leaf devices' forwarding tables include some entries for attached devices (which may be obtained by intercepting packets from attached devices) and other entries learned from source addresses in received encapsulated packets destined for attached devices. In some implementations, the learned entries for devices attached to other leaf devices are cached and aged out after a period of time. By contrast, the entries for the attached devices are not aged out or are aged out much more slowly.

The ingress leaf device's local forwarding table sometimes includes an entry for the destination of a packet on a remote leaf device. In such cases, the ingress leaf device creates an encapsulation based on the content of the forwarding table without using the proxy address and forwards the packet on the overlay network. Of course, if the ingress leaf device is attached to both the source and destination end nodes, it need not send the packet on the overlay network nor encapsulate the packet.

II. Tunnel Encapsulation Points

A tunnel encapsulation point (TEP) generally represents a point of ingress to and/or egress from an overlay network such as one implementing VXLAN. To enter a VXLAN overlay network, a packet passes through a TEP where a VXLAN encapsulation is applied to the packet. To exit the VXLAN overlay network, the packet passes through a TEP where its VXLAN encapsulation is removed. Thus, packets arriving at the network will be encapsulated by a TEP and sent across the network to another TEP where they will be de-encapsulated.

While the discussion in this section assumes that the overlay network encapsulation is VXLAN, other types of overlay encapsulation may be substituted as understood by those of skill in the art.

TEPs can be viewed as encapsulation/de-encapsulation functions within the fabric of the leaf-spine network. Each leaf and spine network device typically contains a TEP, and each TEP is typically associated with an IP address, which, in some embodiments, is shared with the leaf or spine network device on which the TEP resides. Thus, TEPs may be viewed as devices sitting on the network.

TEPs can be conceptualized as performing encapsulation/de-encapsulation as described above, however, in practice, short-cuts may be taken to re-encapsulate a packet which arrives already having an encapsulation. For example, a packet arriving at a spine network device of a leaf-spine network already has a VXLAN encapsulation (applied by a leaf network device) and the re-encapsulation to be applied at the spine network device typically only involves replacing the proxy address in the IP destination address field with the correct destination address of the packet's intended recipient device (assuming the leaf network device doing the original encapsulation did not have this information available). Thus, when a spine TEP is performing this proxy mapping function, rather than strip the previous VXLAN encapsulation and reapply a new one with the correct destination address, typically just the destination address field of the already-present VXLAN encapsulation is modified.

Nevertheless, this proxy service is typically conceptualized as occurring outside the overlay network, for example, by the following sequence: a VXLAN encapsulated packet arrives at the TEP having the proxy mapping function, the packet exits the overlay network, the TEP applies the proxy mapping function to the packet giving it the correct destination IP address, and the re-encapsulated packet is then sent back through the TEP into the overlay network. However, while this is a useful conceptual view, it should be understood that in some embodiments, what actually occurs is a modification of the already present VXLAN header by the proxy mapping function. In this manner, the TEPs in the spine may provide the proxy function described in greater detail elsewhere in this disclosure.

Generally, the leaf and spine network devices each contain a single TEP. However, in some circumstances, it may be advantageous for a leaf or spine network device to have multiple TEPs. For example, in some implementations, there are two TEPs in each spine device, one for a layer 2 proxy and another for a layer 3 proxy. In some embodiments, having multiple TEPs per leaf and/or spine network device may enable an overlay network to provide multiple topologies for managing different types of traffic flows going to the same endpoint.

In one such scenario, network traffic classified as low-latency (benefiting from low response time) is routed on a low-latency path by encapsulating packets at a first TEP primarily dedicated to low latency traffic, and network traffic related to bulk file-transfer (where overall bandwidth is more important than response time and some intermittent delays are acceptable) is routed on a high-bandwidth path by encapsulating packets at a second TEP primarily dedicated to high-bandwidth traffic. For example, encapsulation at the low-latency TEP might route packets along a path which traverses a low-latency spine switch. Generally, a cost will be associated with each path/topology according to the type of packet being routed, the network's current load, and more specifically, the current utilization of each path. Then, load balancing along the multiple paths/topologies may be governed by the assigned costs. In this manner, if for some reason the low-latency path/topology is unavailable (e.g., a link failure has occurred) its associated cost will become higher than the high-bandwidth path/topology, even for low-latency packets, and thus all packets will still reach their intended end points.

A. Extension of the VXLAN Overlay Network into a Server Virtualization Layer

In some cases a TEP may be implemented on an end device such as a server or some other device which is not a dedicated networking device (i.e. a TEP may be associated with a device other than a switch, router, leaf device, etc.). In the context of a leaf-spine fabric overlay network, this would mean, for example, that the end device understands and uses the encapsulation protocol of the leaf-spine fabric overlay network.

For example, as discussed herein, "servers" within a modern datacenter are now oftentimes actually virtual machines that run within a virtualization layer—oftentimes referred to as a "hypervisor"—implemented by one or more underlying physical servers and associated software. By implementing one or more TEPs within said virtualization layer, the overlay network may be extended into the server virtualization layer.

In some embodiments, a VXLAN-based overlay network may be extended into such a server virtualization layer by running a VXLAN-capable virtual switch and TEP (hereinafter "V-switch") within the hypervisor running on one or more physical servers. The V-switch may be software provided by the vendor of the leaf-spine network infrastructure (e.g., Insieme, Inc., Cisco Systems, etc.), or it may be provided by the vendor of the server virtualization software (e.g., VMWare, Microsoft, open source, etc.), or it may be provided by another party, since VXLAN is an open-standard supported by a variety of vendors. However, if the V-switch is developed to work specifically with the architecture of the leaf-spine network, then it may be designed to function in concert with the leaf-spine network, for example, by applying policy to network traffic at the V-switch, in addition to providing the basic VXLAN-encapsulation/de-encapsulation functionality.

Thus, in some embodiments, a specific V-switch designed to work with a leaf-spine network (as described above) may be installed in the hypervisor of a server virtualization software package provided by another vendor. When this is done, the functionality provided by the V-Switch mimics that provided by a leaf network device, albeit in software. For example, network traffic policies generally applied at a leaf network device may now be applied at the V-switch. In effect, such a V-switch extends a virtual boundary of the overlay network into the hypervisor. As explained elsewhere, an advantage of running a VXLAN overlay network within the server virtualization layer is that it can support over 16 million virtual networks (since in the VXLAN header, the VNID field 24-bits wide), whereas a conventional Layer 2 VLAN can only support 4096 distinct virtual networks (due to its 12-bit network ID field). However, despite the attendant advantages of running a VXLAN overlay network within the server virtualization layer, it should be understood that such a configuration is not required of that virtual network for its connection to a network which does employ a VXLAN overlay, such as the leaf-spine fabric overlay architectures described herein.

In some embodiments, a TEP on a leaf device or running in the context of a V-switch within a hypervisor may not only apply encapsulation to un-encapsulated packets, but may also replace encapsulation in one format with encapsulation in a different format that is compatible with the overlay network fabric. This may be necessary where an outside overlay network terminates at the TEP for the network under consideration. A TEP may in some cases treat an encapsulated packet as un-encapsulated when the encapsulation implements a function that should not be perturbed by the fabric, e.g., the encapsulation implements an overlay network running on top of the overlay network under consideration. Such encapsulation should remain intact so it can be processed when the packet exits the overlay network under consideration.

VLANs virtualize layer 2 networks, allowing reuse of MAC addresses but not IP addresses. In a large data center, there may be a very large number of end devices and associated IP addresses. Therefore, the virtualization technology on the end device must be able to support this many nodes. It must do this using a large mapping database as described elsewhere herein. Any time a virtual machine moves, all the mapping database entries for that that machine must be updated. In a large network having hundreds of physical machines, each with many virtual machines, millions of updates may be required. A virtual switch is well adapted to handle management of its part of the mapping database and/or other network administration in comparison to a conventional hypervisor. It also synchronizes well with the fabric leaf and spine network devices that have their own TEPs.

B. Encapsulation of Trusted Versus Non-Trusted Packets Entering the Overlay Network Packets entering the VXLAN fabric overlay network (at a TEP, typically residing on a leaf device, but also in a V-Switch) are treated differently depending on whether they are VXLAN encapsulated or not. If an inbound packet is not VXLAN encapsulated, then it is either un-encapsulated, or it is encapsulated with something other than VXLAN, such as NvGRE. If an inbound packet does have a preexisting VXLAN encapsulation, then the question is whether the packet is a trusted VXLAN encapsulated packet or an untrusted VXLAN encapsulated packet.

Figure 4:
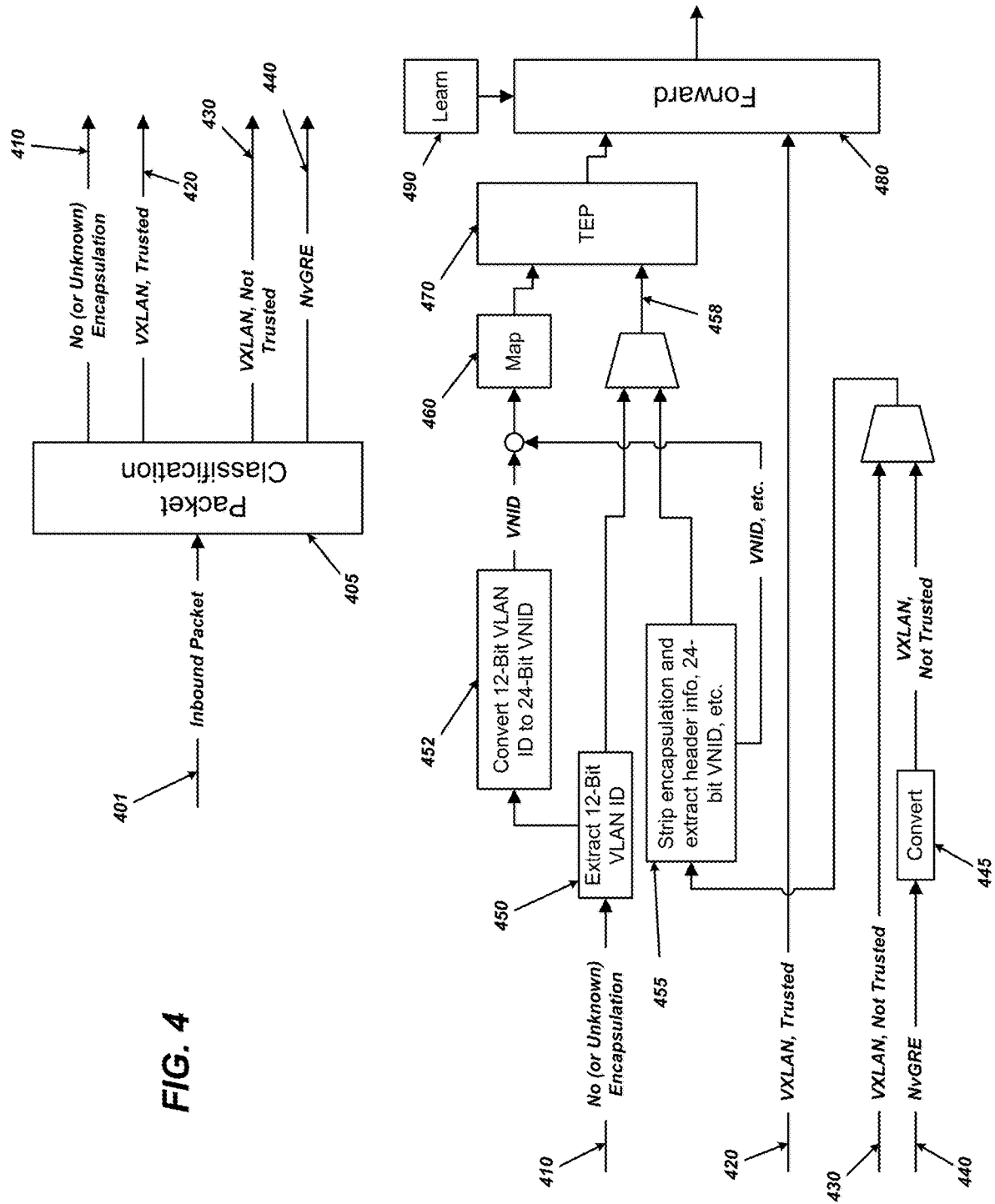
FIG. 4 illustrates sample logic which may be used for the treatment of packets inbound to a VXLAN overlay network.

Sample logic is displayed in FIG. 4 which illustrates the different treatments of inbound packets based on the foregoing distinctions. As shown in the figure, an inbound packet at 401 is classified via packet classification logic block 405 into 4 categories: no (or unknown) encapsulation (410), trusted VXLAN encapsulation (420), untrusted VXLAN encapsulation (430), and NvGRE (or other known non-VXLAN protocol) encapsulation (440).

In the simplest case, the inbound packet already possesses a trusted VXLAN encapsulation (420) and, in this case, the packet simply retains its preexisting encapsulation and is forwarded as-is onto the network via logic block 480. The network device need make no modification to the packet. For the other cases (410, 430, and 440), a VXLAN encapsulation will be applied to (or modified in) the inbound packet at tunnel encapsulation point (TEP) 470.

For a packet lacking an encapsulation (or having an unknown encapsulation), i.e., case 410, the packet's 12-bit VLAN ID is extracted at logic block 450 and converted at logic block 452 to a 24-Bit VNID (see details below), which is then passed to mapping function logic block 460 which determines the appropriate encapsulation (VXLAN) header to be applied to the inbound packet. This information (designating the appropriate encapsulation header) is passed from mapping function logic block 460 to TEP 470, which actually applies the designated encapsulation header to the inbound packet entering the TEP at 458. Once appropriately encapsulated, the packet is forwarded onto the network at forwarding logic block 480.

Similarly, for an inbound packet having a preexisting untrusted VXLAN encapsulation, i.e. case 430, or having another encapsulation (e.g., NvGRE encapsulation), i.e. case 440, the packet will have its encapsulation stripped and its 24-bit VNID extracted at 455. Note that in the case 440 of an inbound NvGRE encapsulated packet, it will have its NvGRE encapsulation converted to VXLAN at 445 prior to having its encapsulation analyzed (and stripped) at 455. In either case, information regarding the prior encapsulation, including the 24-bit VNID is passed from logic block 455 to mapping function logic block 460 which, as with the case of an un-encapsulated packet, determines the appropriate encapsulation to be applied at TEP 470. After TEP 470 applies the encapsulation, the packet is forwarded at logic block 480.

Packets forwarded from a V-switch designed to work with the leaf-spine network are typically treated as having a trusted encapsulation and therefore forwarded as-is (e.g., case 420 in FIG. 4). This is because the V-switch functions like a leaf network device within the leaf-spine network and applies exactly the same encapsulation, as determined by a mapping table which is synchronized and updated in the same manner as those stored in the physical leaf network devices. Which V-switches and their associated virtual servers are trusted, and which are not, may be determined at the TEP of the relevant leaf network device via IP address lookup in a table residing on the leaf network device—the entries in the table set by configuration. Packets entering the network via certain designated ports of the various leaf network devices may also be designed as trusted (for example, by a setting a switch on the physical port). On the other hand, if an inbound VXLAN-encapsulated packet is not trusted (e.g., FIG. 4, case 430), then its VXLAN header is stripped if the header can be identified, and a new VXLAN-encapsulation is determined via a mapping function and applied at the appropriate TEP (e.g., in FIG. 4, determined at mapping function logic block 460 and applied at TEP 470). Thus, in some embodiments, the VXLAN fabric overly network may distinguish between trusted and untrusted packets by determining whether the TEP through which the packets are received is classified as receiving trusted or untrusted packets, and this may be done by checking a table of TEPs which marks TEPs as trusted or untrusted, for instance, classifying trusted TEPs as those that are on a leaf network device and those that are provided as trusted V-switches running in a virtualization environment (e.g., within a hypervisor).

As indicated above with respect to FIG. 4, if a new VXLAN encapsulation is to be applied to an inbound packet at the TEP (because the packet has no encapsulation, or because it has an encapsulation other than VXLAN, or because the VXLAN encapsulation it has is untrusted), the virtual network to which the inbound packet belongs, if any, needs to be identified and captured in the packet's new VXLAN encapsulation. Specifically, a VNID which identifies the inbound packet's virtual network is determined and stored in the VNID field of the VXLAN header of the applied VXLAN encapsulation. Thus, for example, if the inbound packet has no encapsulation, then its 12-bit VLAN identifier is converted into a 24-bit VNID (e.g., at logic block 452 in FIG. 4) and stored in the VXLAN header of the new encapsulation. One advantage of treating un-encapsulated packets in this manner—assigning them a 24-bit VNID in the context of the overlay network—is that it effectively makes the VLAN local to what is outside the overlay network beyond this particular TEP. Likewise, if the inbound packet is NvGRE encapsulated, then the 24-bit VSID (virtual segment identifier) within the NvGRE encapsulation is extracted into a corresponding 24-bit VNID (e.g., at logic block 455 in FIG. 4). Similarly, network identifiers may also be extracted from other encapsulation formats, and possibly converted to 24-bit VNID, as long as this other encapsulation format is understood by a network device's inbound packet handling logic (e.g. FIG. 4), mapping function logic, TEP, etc. Finally, another possibility is that the VNID field of the encapsulation header may be set based on information other than what is carried in virtual network-identifying field of the received/un-encapsulated packet. For instance, the physical port through which the un-encapsulated packet is received by the leaf device may be used to set the VNID in the encapsulation header. (This may be programmed into the leaf device as per-port configuration.) Other possibilities include using the source and/or destination IP and/or MAC address of the received packet, or any other information carried in the received packet which might be advantageously used to identify the packet for purposes of applying policy, etc.

As described above, generally any prior encapsulation is stripped prior to applying the new VXLAN encapsulation, however, in some configurations, the prior encapsulation is retained and ignored by treating it as part of the packet's payload. In some embodiments, this may be set via port-configuration (for example, by setting a physical switch on the port). In particular, if VXLAN-encapsulated packets are not expected on a particular port, then the port could be set to ignore all encapsulations and just treat the entire packet, including any encapsulation, as payload for the subsequent VXLAN encapsulation. This could be useful, for example, if it is intended that another overlay network be operated on top of the fabric overlay network described herein, because preserving the inbound packet's prior encapsulation (the encapsulation of the other overlay network) allows the other overly network to operate seamlessly without relying on (or even knowing) that another encapsulation is being used (atop its own) to transmit its packets. It should also be noted that a packet's pre-existing encapsulation will not be stripped—and therefore treated as payload—if the encapsulation is not known and therefore cannot be identified by the TEP.

Finally, it is noted that "trust" may be implemented at multiple levels. For example, there may be a situation where a particular ingress point to the fabric overlay network is trusted for applying policies but not trusted to apply an encapsulation that is optimized for the fabric. In this situation, a TEP at a leaf device, for example, may preserve the policies but rebuild the encapsulation header using information that is most appropriate for the overlay network under consideration.

C. Termination and Re-Initiation of the Overlay Network to Improve Scalability

Server virtualization and extension of the overlay network into the server virtualization layer may provide some or all the benefits described above, but in some cases it also presents a significant challenge. Because, virtualization of the datacenter effectively replaces each physical server with some number of virtual servers, virtualization may vastly increase the effective number of end devices on the network generating and receiving network traffic. For example, if each physical server connected to the network is used to support 200 virtual servers, then the size of the network has effectively increased by a factor of 200 versus its size in the absence of virtualization.

The problem is particularly manifest in the use and maintenance of the mapping database, both the complete database stored in the spine network devices, and the subsets associated with various end devices stored locally at the leaf network devices. The basic problem is that as a consequence of the virtualization framework, the mapping database has to retain the location and identity of each and every virtual server/machine (VM) in order to properly encapsulate packets for the overlay network.

Therefore, due to these scalability concerns, there may be advantages to be had by actually not extending the overly network into the server virtualization layer provided by each physical server connected to the network. If it doesn't extend into the server virtualization layer, then the boundary of the overly network coincides with the TEPs of the leaf network devices. Of course, it should be understood that whether or not the overlay network extends into the server virtualization layer may be individually configured for each physical server, and in some situations, individually configured for different virtual servers residing on the same physical server.

If the boundary of the overly network coincides with the TEP of the leaf network devices, it is still possible to have a VXLAN overlay network running within the server virtualization layer, but if this is so, it may basically be viewed as a separate overlay network. In this situation, the two overlay networks may be collectively viewed as originating at the TEPs of the V-switches within the server virtualization layer, terminating at the TEPs of the leaf network devices, and reinitiating at the TEPs of the leaf network devices. One consequence of this termination and re-initiation of the VXLAN overlay network is that a leaf network device serving as an ingress point to the overlay network upon receipt a VXLAN encapsulated packet typically replaces the source locator of the encapsulation header with the source locator address associated with its TEP, even if the packet's prior encapsulation is trusted. Likewise, packets egressing from the overlay network at a leaf network device but retaining their VXLAN encapsulation in the termination/re-initiation context also typically have the source locator field of their VXLAN encapsulation replaced with the address of the egress leaf device's TEP. In contrast, if the overlay network is extended into the server virtualization layer via V-switches running on the servers connected to the leaf devices, then the boundary of the overlay network logically coincides with the TEPs of these V-switches rather than the TEPs of the physical leaf devices, and therefore packets traversing these leaf devices do not have the source locator field of their VXLAN encapsulation modified by the leaf devices.

One scenario where the termination and re-initiation view is particularly useful is where there are non-trusted V-switches in the hypervisors of the physical servers connected to the network. In the not-trusted scenario, each leaf network device already redoes the packets' VXLAN encapsulations when it receives them from the V-switches. Therefore, between the hypervisors of the physical servers and the leaf network devices there can be considered to be the termination of one overlay network (the hypervisor network) and the initiation of another (the leaf-spine network).

Thus, using this scenario as an example, packets sent by a virtual server running within a hypervisor will be first encapsulated when they leave the hypervisor and physical server, and then be re-encapsulated by the leaf network device upon receipt. Because of this re-encapsulation at the leaf network device, the original encapsulation applied within the virtualized network of the hypervisor need not be based on knowledge of the locations of all devices on the leaf-spine network. Instead the mapping database used by the TEP within the hypervisor need only be aware of the identities (IP addresses) of the virtual servers running within the hypervisor, and in addition, the IP address of the TEP corresponding to the connecting leaf network device. As a result, the mapping database used by the hypervisor's TEP can be a much smaller database, which dramatically improves the scaling properties of such a leaf-spine network. Leaf network devices typically have the same number of downlink TEPs as they have downlink ports, but the number of TEPs in the hypervisor's virtual switch is typically only 2. One which applies some encapsulation to traffic bound for the VMs within the hypervisor, i.e. its own TEP address, and another which encapsulates traffic bound for the leaf network device.

While, this termination/re-initiation paradigm has been described in the context of connections with untrusted V-switches, it should be noted that it can also be implemented in the context of trusted devices. In some implementations, a trusted packet is re-encapsulated to improve scale through the overlay network.

III. Forwarding Using Mapping Databases

A. Introduction and Context

As explained, the mapping database maps identities (or identifiers) to locations (or locators). In one way of viewing the distinction between identities and locations, the location is the "outer" address while the identity is the "inner" address. The outer address is in the encapsulation header (e.g., VXLAN or NVGRE header), while the inner address is in the encapsulated packet. As an end device moves between positions on a network, its location changes but its identity may stay the same due to the separation of location from identity provided by the overlay network.

Location:

The destination address in the encapsulation identifies a TEP, which has a location on the network. Thus, each entry in the mapping database may be uniquely identified by a distinct destination address of a network TEP. In some implementations, this location is identified by an IP v4 address, while in other implementations the location is identified by an IP v6 address. Other types of tunnel encapsulation could use other location identifiers.

Identity:

In some implementations, the identifier in the mapping database includes one or more of a MAC address, an IP v4 address, and an IP v6 address. The choice depends on the stack used to forward the packet, which generally reflects the capability of the source and destination end devices. Further, some implementations require both an address and a context to uniquely identify each network identifier. The context may be a virtual network identifier such as a VNID. Therefore, in some implementations, the unique identifier for an entry in the master database is made from a virtual network identifier and a destination address. Again, the destination address may be a MAC address or an IP address. In some implementations, the entire VNID and destination address of an end device are combined in a fixed size value (e.g., a 56 bit field). This value may serve as a key into the network forwarding table.

The overlay network may learn the identity of a new device by capturing its first packet and examining the source information, including the virtual network, if any, to which it belongs. The leaf device may communicate this information by a protocol such as COOP or LISP. The overlay network already knows the location of the new device. It may be the leaf network device to which the new device is attached. The location is specified by the TEP address (facing the overlay network under consideration).

In the complete version of the mapping database, there are entries for all end devices, many of which may be virtual end devices. The virtual end devices may correspond to virtual interfaces (e.g., VNICs) attached to the overlay network TEPs.

The overlay network maintains two flavors of the mapping database: one in the spine tier and the other in the leaf tier. The one in the spine tier has more entries but fewer pieces of information about each entry. The spine tier version maintains a separate entry for each end device attached to the overlay network, but in some embodiments, less information is kept about each record. In some cases, only two pieces of information are required at the spine level: identities and locations. Other information may be superfluous for purposes of the spine devices' functions. As explained, the identity may be an end device's address (MAC or IP) and context (e.g., virtual network), while the location may be a TEP IP address on the overlay network. Logic for accessing the spine device database may be implemented in hardware, software, or a combination thereof. In some embodiments the spine device database described above may be located someplace other than in the spine. The mapping database and the associated proxy function may be located on one or more of the network devices of the spine tier, or the mapping database may be located on—and the proxy function performed by—another network device which is associated with and accessible to the network devices of the spine tier.

At the leaf level, more information is kept such as physical port information for leaf device forwarding outside the fabric. In certain embodiments, the leaf level mapping database required for the overlay function is merged with one or more other conventional components such the forwarding database required for normal routing. Policy information may be stored in the merged database.

Example tables that may be maintained by leaf devices, spine devices, proxies, and/or other devices will be described in further detail below. Any of these tables may be implemented in software and/or hardware.

B. Packet Forwarding at Leaf Devices Using Forwarding Tables

When a leaf device receives a packet addressed to a destination end device, the leaf device looks up information pertinent to the forwarding of the packet. From this information, the leaf device may determine the appropriate device or tunnel endpoint to which the packet should be forwarded and possibly the network context. For example, the leaf device may obtain an address (e.g., IP address) for a tunnel endpoint (TEP) to which the packet is to be forwarded. In addition, the leaf device may determine whether encapsulation is appropriate and, if so, obtain further information for use in encapsulating the packet. The leaf device may encapsulate the packet, as appropriate, and forward the packet to the appropriate TEP or device (e.g., where the end device is local to the leaf device). The leaf device also should be able to bridge or route packets to end devices attached to it.

The leaf device obtains forwarding information from one or more tables. The leaf device uses identifier information about the destination device to look up location information. If the leaf device has stored or cached a current location of the end device and such location is on a different leaf device, the forwarding leaf device may encapsulate the packet, as appropriate, and forward the packet to a spine device. However, if the leaf device does not have a location of the end device, it may encapsulate the packet, as appropriate, and forward the packet to a device hosting a proxy function that is capable of inserting the location of the end device into the encapsulation header of the packet. The proxy function may be implemented at spine or leaf devices, or at a separate device such as a server.

1. Detailed Description of Sample Tables Maintained by Leaf Devices

When a leaf device receives a packet, it may look up an identifier of the end device in its local forwarding/database table(s). While the leaf device may maintain a single local forwarding table that contains information pertinent to packet forwarding, in the examples set forth below, the leaf device maintains three separate local tables that are used in combination to bridge, route, and/or encapsulate the packet, as appropriate. These tables include a forwarding table, adjacency table, and encapsulation table, which will be described in further detail below with reference to FIGS. 5A, 5B, and 5C. FIG. 5A is a diagram illustrating an example forwarding table that may be maintained by leaf devices in accordance with various embodiments. FIG. 5B is a diagram illustrating an example adjacency table that may be maintained by leaf devices in accordance with various embodiments. FIG. 5C is a diagram illustrating an example encapsulation table that may be maintained by leaf devices in accordance with various embodiments.

Forwarding Table

FIG. 5A is a diagram illustrating an example forwarding table that may be maintained by a leaf device in accordance with various embodiments. As shown in this example, each entry in the forwarding table may include an identifier A02. The identifier A02 may include an address such as a MAC address and/or IP address. In addition, the identifier A02 may further include a Virtual Network Identifier (VNID). Thus, each entry in the forwarding table may include an address and a VNID. To uniquely identify a device, it may be identified by its VNID and IP address or, alternatively, its VNID and MAC address. In addition, each entry in the forwarding table may further include at least one indicator that classifies the address as a MAC address or an IP address. Where the entry's address is an IP address, at least one indicator may indicate whether the IP address is an IPv4 or IPv6 address.

Each entry in the forwarding table may further include a number of paths A04 that are possible. More particularly, where an IP address is associated with two or more devices, there will be more than one possible path to these different devices.

While the forwarding table may be implemented as a single table, the forwarding table in the depicted example is subdivided into multiple tables such as a forwarding/cache table, an adjacency table, and an encapsulation table, which will be described in further detail below with reference to FIG. 5B and FIG. 5C, respectively.

In this embodiment, each entry in the forwarding table may further include an adjacency pointer A06 (or address) into an adjacency table, as will be described in further detail below.

The forwarding table may also include policy information that is to be applied to the device. In the example of the forwarding table shown in FIG. 5A, each entry includes a class A10 indicating a group in which the end device corresponding to the entry is categorized. The policies corresponding to the class may then be applied to the packet.

Policies between groups may be applied by looking up the class of the source address and the class of the destination address. For example, one group within one company may be prevented from communicating to another group within the company.

In some embodiments, the leaf device may age out entries in its forwarding table. This may be accomplished by periodically deleting entries from the tables when those entries have been in the tables for longer than a threshold period of time. It may be desirable to age out only those entries that were created using information learned from data packets received via forwarding on the fabric. In other words, those entries generated using information obtained from packets received from outside the fabric may not be aged out or, alternatively, may be aged out after a different (e.g., longer) threshold period of time. Accordingly, entries that do not correspond to local end devices may be aged out periodically to ensure that memory is not unnecessarily consumed.

Adjacency Table

FIG. 5B is a diagram illustrating an example adjacency table that may be maintained by leaf devices in accordance with various embodiments. Once an adjacency pointer is identified from its forwarding table, the leaf device may access the corresponding entry in the adjacency table.

Each entry in the adjacency table may include a VNID field B04 including the VNID, and a MAC field B06 including a MAC address.

The entry may include encapsulation information such as a TEP IP address to which the packet is to be forwarded. However, the encapsulation information may occupy a large number of bits. For example, each TEP IP address may consume 32 bits. Rather than storing the relatively few TEP IP addresses repeatedly in the adjacency table and consuming memory unnecessarily, the TEP IP address may be stored in a separate encapsulation table. More particularly, the entry in the adjacency table may include an encapsulation (ENCAP) pointer B08 (or address) that points to an entry in an encapsulation table, where the entry in the encapsulation table includes the TEP IP address. An example encapsulation table will be described in further detail below with reference to FIG. 5C.

Each entry in the adjacency table may further include CTRL bit(s) B10, which may indicate whether the packet is to be sent via an uplink to the fabric (e.g., to a spine device) or via a downlink (e.g., to a local end device), and therefore may indicate whether the packet is to be encapsulated and, if so, a type of encapsulation (e.g., VXLAN, NVGRE). Therefore, the CTRL bits may be used to ascertain whether to encapsulate the packet and, if so, how to encapsulate the packet.

Where the device identified by the adjacency pointer A06 is connected to a physical port of the leaf device, the entry may include an identifier of the physical port B12 of the leaf device. Alternatively, the forwarding/cache table may include the leaf device physical port A08.

Encapsulation Table

The encapsulation information output by the adjacency table, B08, is a pointer to an encapsulation table. FIG. 5C is a diagram illustrating an example encapsulation table that may be maintained by leaf devices in accordance with various embodiments. The encapsulation table may include a single field which includes a TEP IP address C04. In some embodiments, for each entry, C04 may store a 32-bit IP v4 address or a 128-bit IP v6 address. In some embodiments, each entry may have an additional field C06 which indicates which ports of the leaf device may be used to send packets. In some embodiments, the encapsulation table may also additionally include a list of available spine devices (not shown in FIG. 5C) for receiving encapsulated packets forwarded to the destination address.

The total number of TEPs is the total number of encapsulations required in the overlay network. There may be a few hundred or a thousand of these, yet there are many thousands of destination addresses, i.e. identifiers, for the network. Therefore, use of an encapsulation table potentially saves a great amount of memory space, since rather than repeat the encapsulations for each identifier address, the adjacencies table may simply provide a pointer into the encapsulation table.

2. Example Process Performed at the Leaf Devices

While many implementations are possible, one example of a forwarding process is provided here. It may be implemented in hardware. The process involves obtaining destination identifier information from an inbound packet and determining network location information from the leaf version of the mapping database. This process is used for forwarding packets and is separate from the learning function performed by the leaf devices.

In some cases, upon receiving a packet, the leaf device may ascertain a tunnel end point (TEP) of a spine device or proxy and send the packet to the proxy. In some cases, the leaf device may identify the TEP of the end device using information available to the leaf device. In some cases, the leaf device may bridge or route a packet without encapsulation. In some cases, the leaf device may bridge or route a packet and then perform the encapsulation. The leaf device's mapping function may be accomplished by performing a look up in a table such as a forwarding table. In some embodiments, the forwarding table may be subdivided into further tables, which may include an adjacency table and encapsulation table, as described herein.

The destination MAC address specified in a header of the packet may be used to determine whether the packet should be bridged or routed (as determined by the source end node's network logic). More particularly, if the destination MAC address is the MAC address of a default router, then the packet was intended to be routed, and otherwise, the packet was intended to be bridged. The leaf device's forwarding logic may have a list of default router MAC addresses that it checks to determine whether to bridge or route. In many implementations, leaf devices themselves serve as default routers. Regardless, when an attached end device sends a packet to be routed, the leaf device recognizes this by the packet's destination MAC address, which may, in some cases, be that of the leaf device receiving the packet.

The leaf device may then construct a destination identifier, which is used as a key to the forwarding table. If the packet is to be bridged, the VNID and destination MAC address may be used by the leaf device as a key to the forwarding table. However, if the packet is to be routed, the VNID and the IP address may be used as a key to the forwarding table. In some embodiments, the VNID may be a layer 2 VNID or a layer 3 VNID. More particularly, if the packet is to be bridged, the VNID is a layer 2 VNID; if the packet is to be routed, the VNID is a layer 3 VNID. More specifically, as explained above, the VNID may be a 24-bit field in certain types of encapsulation, such as VXLAN. Which form is used depends on whether the packet is being bridged or routed. A "type" field indicating the type of address may also be constructed from header information in the received packet when more than one type of address may be encountered (MAC, IPv4, or IPv6, for example). Note that the proxy function of the spine device forwarding logic (residing on the spine devices themselves or on a separate proxy device) may also obtain and interpret the destination identifier—again which may contain a VNID together with an IP or MAC address and in some embodiments an address-type field. Once the appropriate entry in a forwarding table is identified using a destination identifier constructed as set forth above, a number of paths and adjacency pointer may be obtained from the entry in the forwarding table. If the number of paths is one, the adjacency pointer may be used to look up the corresponding entry in the adjacency table. If the number of paths is greater than one, a randomized offset based on a hash of the packet may be added to the adjacency pointer to create a new adjacency pointer. The CTRL bit(s) in the adjacency table entry may be used to determine whether the packet is being sent to the fabric. In addition, a corresponding TEP IP address may be obtained. More particularly, rather than storing the TEP IP address multiple times in the adjacency table and consuming memory unnecessarily, the TEP IP address may be stored in a separate encapsulation table. Therefore, the ENCAP pointer may be obtained from the adjacency table, where the ENCAP pointer is used to obtain a TEP IP address from a corresponding entry in the encapsulation table.

If the packet is not being sent to the fabric, the leaf device may determine whether to encapsulate or not and which physical port to use, for instance as specified in the adjacency table, and the packet may be sent via said physical port.

Assuming that the packet is being sent to the fabric, the leaf device may determine a spine device to which the packet should be routed or bridged. In some embodiments, load balancing may be performed during the selection of a spine device.

Figure 6:
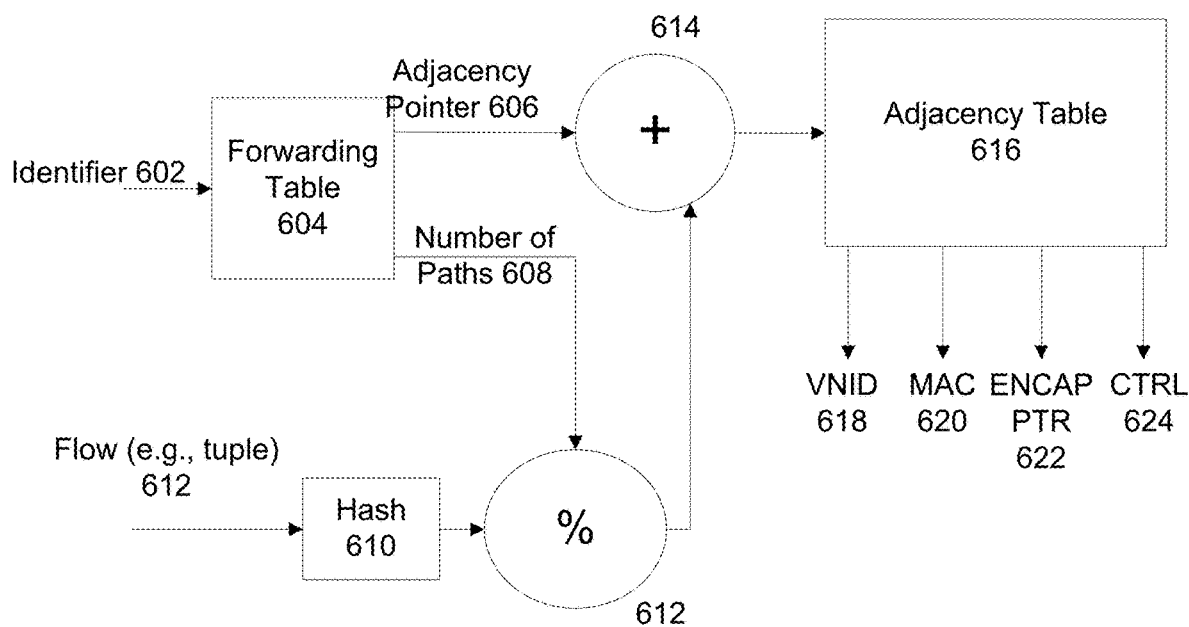
FIG. 6 is a diagram illustrating an example mechanism that may be used by a leaf device to forward a packet in accordance with various embodiments.

FIG. 6 is a diagram illustrating an example mechanism that may be used by a leaf device to forward a packet in accordance with various embodiments. In some implementations, the mechanism is implemented in hardware. However, the mechanism may also be implemented, at least in part, in software.

As shown in FIG. 6, a leaf device may look up a destination identifier 602, which may be constructed as set forth above, in its forwarding table 604 to obtain an adjacency pointer 606 and number of paths 608. In addition, a hash function 610 may be applied to flow information such as a 5-tuple for the flow, as shown at 612. A modulo function 612 may be applied to the hash of the 5-tuple and the number of paths 608, and the resulting number may be used to load balance among TEPs that have paths to the destination. For example, where the number of paths is 1, the result may always be 0; but where the number of paths is 2, for example, the result may be 0 or 1; and, more generally, when the number of paths is a positive integer n, the result may be a positive integer in the range 0 to n−1 which determines which of the n paths the packets should traverse. Thus, in some embodiments, this number may be added at 614 to the adjacency pointer 606, and the result may be used to perform a look up in an adjacency table 616 in order to identify a TEP. Due to multiple paths, there may be two different possible tunnel endpoints that may be selected, TEP1 and TEP2. Thus, if appropriate, the leaf forwarding logic accesses the encapsulation table, and for packets directed into the network fabric, the encapsulation table may provide a TEP IP address of the overlay destination and, in some embodiments, a list of available spine devices, the multiple spines devices made available for load balancing.

In this example, an entry in the adjacency table 616 may be identified as a result of the look up. For example, the entry in the adjacency table 616 may include a VNID 618, destination MAC 620, ENCAP PTR 622 (to a TEP IP address), and CTRL bit(s) 624. Which of these fields is used for forwarding depends on whether the packet is to be bridged or routed. As explained, a leaf device makes a bridging versus routing decision by examining the destination MAC address of an incoming packet. If the MAC address is that of a router, the source intends the packet to be routed. Otherwise, it is to be bridged. If the packet is to be bridged, the VNID is not changed and the MAC address is not changed. However, the leaf device may still need to apply encapsulation, which provides the address of the TEP, which also exists in the proxy mapping database located in the spine tier.

The control bits can provide instructions for various purposes such as limitations on available fields. In some implementations, the bits may specify whether the TTL field of the IP packet should be decremented or whether, when routing, to replace the MAC address or not.

Referring again to FIG. 6, the leaf device may encapsulate the packet and send the packet to the TEP IP address given through ENCAP pointer 622. More particularly, the packet may be encapsulated at a TEP of the leaf device. The information in the adjacency table entry and encapsulation table entry may be used to encapsulate the packet.

If the packet is not being sent to the fabric, the packet may be encapsulated or otherwise modified to reach the destination. Such modification may include replacing the VNID with the VNID 618 from the table and/or destination MAC 620, as appropriate, and sending the packet via a physical port. In some embodiments, the leaf forwarding logic may provide physical port identifiers for packets directed outside of the overlay network via entries in the leaf device's adjacencies table.

Note that if the destination identifier upon lookup in the leaf forwarding table/database cache results in a "miss," a fixed (default) adjacency entry is returned. This will provide an encapsulation for the proxy TEP on the spine, which may be different depending on whether the underlying packet is a layer 2 packet or a layer 3 packet. In some implementations, the spine device acting as the proxy TEP is chosen by a function such as a hash. In other implementations, the spine device proxy TEP is pre-set for a given leaf device. In some cases, the table provides multiple options for proxy TEP addresses chosen based on the input destination identity from the packet.

With regards to routing, as explained, the forwarding logic of the leaf device receiving the inbound packet may make the determination that it must route the packet. In order to preserve the external routing semantics expected by devices external to the overlay network, the forwarding logic of the receiving leaf device will change the received packet's MAC address to the appropriate destination MAC address and also apply the appropriate VNID and decrement the TTL. The modification is done to the appropriate layer 2 fields of the underlying packet, and not to the encapsulation header. This contrasts with the semantics of bridging, where the underlying packet's destination MAC address remains unaltered through the forwarding process.

Thus, in the routing context, the forwarding logic of the receiving leaf device replaces the MAC address of the destination (or possibly the next hop router) in the underlying packet (not in the encapsulation), and in the example presented above, it does this by taking the MAC address output of the adjacency table. The leaf device then applies the new destination MAC address to the underlying packet before forwarding to the fabric (or to a network outside the fabric). For routing into the fabric, it must also apply the appropriate encapsulation for the overlay network. The leaf device may also need to apply the correct VNID for the destination. It also gets this information from the adjacency table. Forwarding tables in classical routers provide destination MAC address and VLAN combinations. Again, for comparison, when the packet is to be bridged, the VNID and the destination MAC address are maintained in the packet, but the encapsulation, if needed, is obtained from the adjacency and encapsulation tables.

Note that when routing into the fabric (ingress), the MAC address of the next router may be the MAC address of a leaf device attached to the destination end device. The MAC address of all leaf devices (acting as routers) is the same in some embodiments. Therefore, it is a simple matter to identify the MAC address of the router in the overlay fabric when routing into the fabric. All that needs to be known about the ultimate end device is its IP address and possibly the virtual network identifier.

When routing out of the fabric (egress), the destination end device may be local to the leaf device, in which case the leaf device knows the destination's MAC address from the local version of the mapping database, as implemented in the adjacency table in the depicted embodiment.

Also note, in some embodiments, the leaf devices' versions of the mapping database may include a "class" field for implementing policy. Policy can be applied by the leaf devices at the ingress leaf device or at the egress leaf device.

3. Leaf Devices Directing Packets to the Proxy Function

In the event that the leaf device does not have an entry in its forwarding table for a given destination end device, the leaf device may encapsulate the packet with a proxy IP address in the destination locator IP address field and forward the packet to a proxy address of a proxy. Then, as described in further detail elsewhere herein, upon receiving the encapsulated packet, the proxy function operates by parsing through the encapsulation and extracting the destination identifier associated with the underlying tenant packet. The proxy function then looks up this destination identifier in the mapping database to determine the appropriate destination locator for the packet, and uses this address to replace the proxy's IP address in the destination locator field of the encapsulation header. Typically, the destination locator used to replace the proxy's address is the address of the TEP associated with the target end device (e.g., an IP address of the destination leaf device connecting the destination end device). Once labeled with the appropriate destination locator address, the packet is forwarded on to its destination. The proxy functionality may be implemented at one or more spine devices or at one or more other devices such as special and/or dedicated proxy devices. In some embodiments, the proxy function located on the spine or elsewhere may be accessed through an "anycast" address. In any event, since generally the proxy function is accessed through its IP address, it can reside anywhere there is L3 connectivity. Note that the only field of the encapsulation header which is changed is the destination locator field. No other fields of the encapsulation header, and no fields of the underlying tenant packet are altered by operation of the proxy function. By preserving the original source fields of the iVXLAN header and underlying packet, the egress leaf device receiving the packet is able to cache the results correctly.

Thus, upon receipt of an inbound packet addressed to an end device which the receiving leaf device does not have in its local forwarding table, the leaf device may obtain a proxy address associated with one or more devices configured to perform proxy functionality. In some embodiments, the leaf device may perform a look up for the destination identifier in its forwarding table to obtain an adjacency pointer to an entry in the adjacency table. If the identifier is not present in the forwarding table, a default entry to the adjacency table may be returned. The entry in the adjacency table may include a proxy address associated with one or more devices configured to perform proxy functionality.

As explained, the proxies may be maintained at one or more devices such as a spine device which may include a layer 2 proxy and a layer 3 proxy. Where the packet is to be bridged, the packet may be sent to the layer 2 proxy. Alternatively, where the packet is to be routed, the packet may be sent to the layer 3 proxy.

To implement forwarding to both the layer 2 and layer 3 proxies, the forwarding table may include two different entries for a given device. More particularly, an identifier including a VNID and MAC address may correspond to a layer 2 entry, while an identifier including a Virtual Network Identifier (VNID) and IP address may correspond to a layer 3 entry. Thus, a layer 2 key to the forwarding table may include the VNID and MAC address, while a layer 3 key to the forwarding table may include the VNID and IP address. The layer 2 entry may include an adjacency pointer to a first entry in the adjacency table which has an encapsulation pointer to a first entry in the encapsulation table, enabling a TEP address of the layer 2 proxy to be obtained. Similarly, the layer 3 entry in the forwarding table may include an adjacency pointer to a second entry in the adjacency table that has an encapsulation pointer to a second entry in the encapsulation table, enabling a TEP address of the layer 3 proxy to be obtained.

C. Packet Forwarding at Spine Devices Using Forwarding Tables

Example tables that may be maintained by spine devices and proxies are described in further detail below. Any of these tables may be implemented in software and/or hardware and/or a combination of software and hardware.

As described above, in the event that a leaf device does not have a locator for a particular end device identifier in its local mapping table(s)/cache, the leaf device may send the packet to a proxy so that the proxy may look up the locator for the end device in one or more forwarding tables associated with the proxy function.

In various embodiments, the proxy function is implemented at a spine device. However, a proxy device need not be implemented in the spine. For example, a proxy may be implemented by a device such as a server that is separate from the spine and leaf devices.

When implemented at the spine, typically the proxy function is associated with (or accessible to) each spine device and the proxy function has access to the complete mapping database. However, it should also be understood that, in certain implementations, the proxy is provided in a subset of the spine devices, and that in certain implementations, the mapping database may be split across multiple proxies.

It is additionally noted that caching of the mapping database at the leaf devices also helps to alleviate any hotspots on the spine that might result from a proxy configuration wherein the mapping database is split across multiple proxies or spine devices; or hotspots that may result from the proxy function only being provided at a subset of the spine devices.

1. Detailed Description of Sample Tables Maintained by Spine/Proxy Devices

Proxy mapping table(s) may be maintained by each proxy device to enable the proxy device to forward packets. Where the proxies are implemented in the spine, the proxy mapping table(s) may be implemented as a mapping table such as that described below with reference to FIG. 5D.

In some embodiments, a proxy may act as a layer 2 proxy or a layer 3 proxy. For example, a layer 2 proxy may maintain a layer 2 proxy mapping table, while a layer 3 proxy may maintain a layer 3 proxy mapping table. In some implementations, a first proxy may maintain the layer 2 proxy mapping table, while a second proxy may maintain the layer 3 proxy mapping table. In other implementations, a single proxy may maintain both the layer 2 proxy mapping table and the layer 3 mapping table or an equivalent combined table. Thus, although shown and described below as two separate tables, the layer 2 proxy mapping table and layer 3 proxy mapping table may be combined into a single table. Further, as discussed below, where the proxy is implemented in the spine, the single table may be maintained by the spine device.

FIGS. 5D, 5E, and 5F present forwarding/database tables that may be used in spine network devices and/or related proxy-function devices in certain embodiments. FIG. 5D is a diagram illustrating an example mapping table that may be maintained by a spine device, proxy, or mapper in accordance with various embodiments. FIG. 5E is a diagram illustrating an example layer 2 proxy mapping table that may be maintained by a proxy device in accordance with various embodiments. FIG. 5F is a diagram illustrating an example layer 3 proxy mapping table that may be maintained by a proxy device in accordance with various embodiments.

Mapping Tables

When a spine device receives a packet, it may forward the packet to its intended destination. The spine device may be able to forward the packet using information obtained from the packet header. As explained, the spine device may also serve the role of a proxy to identify locations for end devices whose locations are unknown to the leaf devices. In such instances, the spine device may ascertain the location of the destination end device and insert the locator in the packet header. In some embodiments, the spine device may perform a look up using its mapping table. A similar process may be performed by a non-spine device serving the role of proxy or mapper.

FIG. 5D is a diagram illustrating an example mapping table that may be maintained by a spine device, proxy, or mapper in accordance with various embodiments. Generally, the mapping table maps identity to location. As an end device moves within the network, its identity does not change. However, its location does change. Broadly speaking, the mapping table/database keeps track of these changing locations by maintaining a correspondence between packet destination identities and destination locators.

In this example, each entry in FIG. 5D includes an identifier D02 and a locator D04. The identifier D02 may include an address D06 such as a MAC address or IP address. In addition, the identifier D02 may include a Virtual Network Identifier (VNID) D08. The identifier D02 may further include an address type field D010 that indicates whether the address is a MAC address or IP address, as well as whether an IP address is a IPv4 or IPv6 address. In some embodiments, a single identifier may be generated from the VNID and the address, enabling a look up to be performed in the mapping table using a single value.

The locator D04 may include an IP address identifying a location of the device, which may be a TEP. For example, the locator D04 may identify an IP address of a leaf device.

The spine devices are aware of the locations (TEPs) of all leaf devices. Therefore, once the spine device obtains a locator identifying an IP address of a leaf device, the spine device may forward the packet to the leaf device.

FIG. 5E is a diagram illustrating an example layer 2 proxy mapping table that may be maintained by a proxy in accordance with various embodiments. As shown in this example, the layer 2 proxy mapping table may include an identifier E02 and a locator E04. The identifier E02 may include a VNID E06 and a MAC address E08.

FIG. 5F is a diagram illustrating an example layer 3 proxy mapping table that may be maintained by a proxy in accordance with various embodiments. The layer 3 proxy mapping table may include an identifier F02 and a locator F04. The identifier F02 may include a VNID F06, an IP address F08, and also may include an address type F10. The address type F10 may indicate whether the IP address F08 is an IPv4 address or an IPv6 address.

Thus, upon receiving the packet, the proxy (e.g., a spine device hosting the proxy function) performs a look up in its mapping table(s) to obtain a locator, which is specified by an IP address. Where the proxy is a layer 2 proxy, the layer 2 proxy may perform a look up in its mapping table such as FIG. 5E using the VNID and MAC address to obtain the IP address. Alternatively, where the proxy is a layer 3 proxy, the layer 3 proxy may perform a look up in its mapping table using the VNID and IP address to obtain the IP address. The proxy then replaces the proxy IP address in the encapsulated packet with the destination IP address and forwards the encapsulated packet.

Figure 7:
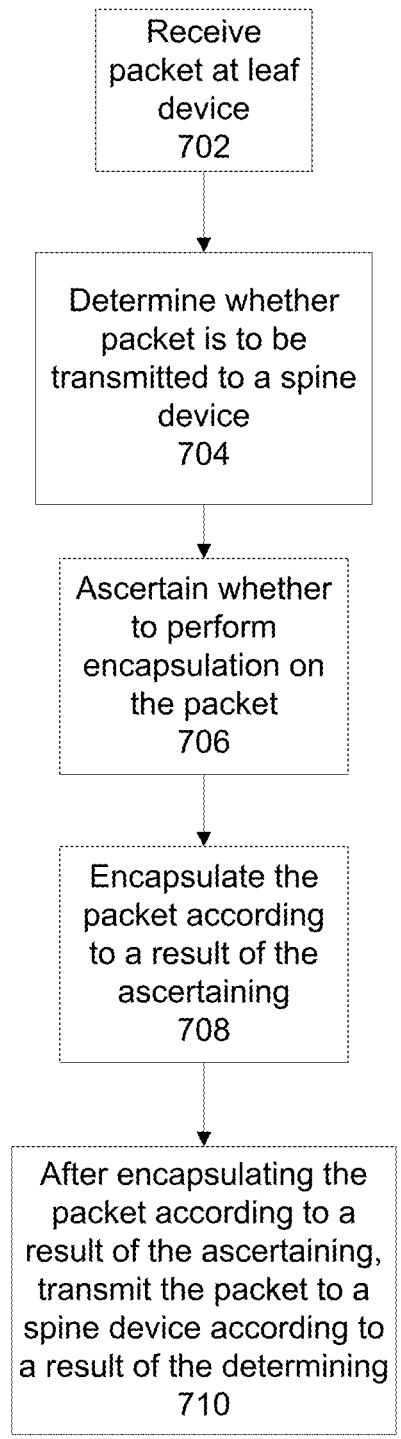
FIG. 7 is a process flow diagram illustrating an example of various decisions that a leaf device may make before forwarding a packet.

FIG. 7 is a process flow diagram illustrating an example of various decisions that a leaf device may make before forwarding a packet. A leaf device may receive a packet addressed to a destination end device at 702. If the packet is a fully trusted encapsulated packet, it can forwarded as is without adjusting any portion of the header or applying encapsulation. The following decisions, to the extent they are made by a leaf device, need not be performed in the order listed.

The leaf device determines whether the packet is to be transmitted into the fabric or outside the fabric at 704. For example, the leaf device may perform a look up for an identifier of the end device in its mapping database and ascertain from the ENCAP PTR field B08 and corresponding entry in the encapsulation table whether the packet is to be sent into the fabric. The CTRL field B10 of the adjacency table then indicates whether to use the encapsulation or not. Also, in addition to directing the packet "into the fabric," the foregoing entry in the encapsulation table may instead provide an indication that the packet is to be sent "outside the fabric" through one of the listed output ports.

The leaf device may ascertain based, at least in part, on a header of the packet whether to perform encapsulation on the packet at 706. The packet will identify the device from which the packet was received. In some embodiments, the leaf device may determine whether the device from which the packet is received is a trusted device. The leaf device may ascertain whether to perform encapsulation on the packet based, at least in part, upon whether the device is at least partially trusted device, as described herein.

In addition, the leaf device may determine (e.g., from the header(s) of the packet) whether the packet has previously been encapsulated (e.g., whether the packet is currently encapsulated). Where the leaf device determines that the packet has previously been encapsulated, the leaf device may determine a type of encapsulation of the packet. The leaf device may ascertain whether to perform encapsulation on the packet based, at least in part, upon the type of encapsulation of the packet, as described above. The leaf device may choose to leave an existing encapsulation or remove an existing encapsulation and re-encapsulate using encapsulation required by the overlay network. This may be appropriate when transferring a packet from one overlay network (employing a first encapsulation format) to the overlay network of the leaf spine fabric that is the current focus.

Where the packet is to be transmitted downward via a port of the leaf device, the leaf device may obtain information indicating whether encapsulation is appropriate and, if so, the type of encapsulation to be performed.

The leaf device may encapsulate the packet according to a result of the ascertaining at 708. More particularly, where the leaf device determines that the packet should be encapsulated, the leaf device may encapsulate the packet (e.g., with a VXLAN header). After encapsulating the packet according to the result of the ascertaining, the leaf device may transmit the packet to a spine device according to a result of the determining at 710. The packet may be encapsulated and transmitted using tables such as a forwarding table, adjacency table, and encapsulation table, as described herein with reference to FIG. 6.

To determine an appropriate TEP to which the packet is to be transmitted on the overlay network, the leaf device may ascertain an identifier of an end device (destination device)

to which the packet is addressed from a header of the packet. The leaf device may then determine whether it has stored a location of the end device (a tunnel endpoint address).

Where the leaf device determines that it has a location of the end device, the leaf device may forward the packet to an appropriate spine device. For example, the spine device may be selected based, at least in part, on an identifier of an end device (destination device) ascertained from a header of the packet and/or a flow associated with the packet. The packet may be encapsulated and transmitted to the selected spine device.

If the leaf device determines that it does not have a location of the end device, the packet may be encapsulated such that a header of the packet identifies a proxy. Once encapsulated, the packet may be transmitted to the proxy. In some instances, the proxy may be selected from among two or more proxies. For example, the proxy may be selected based, at least in part, on an identifier of an end device (destination device) ascertained from a header of the packet and/or a flow associated with the packet. In some embodiments, the proxy may be selected from a layer 2 proxy and a layer 3 proxy. As described above, a proxy may be implemented in a spine device, but need not be implemented in the spine. For example, the proxy may be implemented in a device such as a server that is separate from the spine and the leaf devices.

Where a proxy receives the packet, it replaces the proxy address in the destination IP address field with the destination TEP IP address and transmits the packet. For example, the packet may be transmitted to the spine by the proxy. The spine may then transmit the packet to its intended destination.

2. End Devices and Default Routers

An end device may learn an IP address of its default router via some mechanism such as ARP. When the end device wants to send a packet, it compares its subnet with the subnet of the destination device. If the subnets match, it will send an ARP request identifying a MAC address of the destination device. In response, it will receive the MAC address of the destination device. The end device will then send the packet to that MAC address and a router is not needed.

If the subnets are not the same, the end device will send an ARP request identifying the IP address of its configured default router. In response, it will receive the MAC address of the default router having that IP address. Typically, the default router is the leaf device to which the end node is attached. In some embodiments, all of the leaf nodes may be configured (e.g., via a controller) with the same MAC address. In this way, the end-devices devices do not have to keep track of separate MAC addresses for the various leaf devices on the network to which they may be attached.

3. Leaf Device Learning of New/Moved End Device Location/Identity Information; Populating the Local Mapping Table/Cache The leaf devices may learn location and identity information pertaining to end devices and store this information in its local mapping table(s). More particularly, a leaf device may learn information from packets received from the network via its uplinks or from the end devices connected to it. Such packets may include data packets, gratuitous ARP and DHCP requests.

When a leaf device receives a packet from an end device connected to it, it learns the end device's identity and associates it with its location, which is an address of the leaf device. More particularly, the location may include an IP address of the leaf device's TEP that received the packet.

Learning is also done (by the leaf devices) when packets egress the overlay network through the leaf devices. At packet egress, the leaf device accesses its local mapping cache, looks up the packet's source identifier, and if there is a miss, the leaf device populates its cache with a new cache entry consisting of the packet's source identifier (qualified by the VNID), source locator, and also the SClass fields from the iVxLAN header. (The SClass is later used as the DClass (destination class) for packets traversing in the reverse direction.) In a similar fashion, if there is a hit when looking up the source identifier but the locator and/or Class field in the table are different from those in the packet, the entry is updated with the information in the packet. As discussed previously, since this learned identity/location information does not correspond to a locally attached end device, these cached entries are aged out—i.e., they are removed from the local mapping table when they are not used for some specified time interval.

4. Pre Populating of the Leaf Device Local Mapping Table/Cache

In some embodiments, each leaf device local mapping table/cache may be pre-populated with all identifiers that are local to the leaf device. These entries are not aged-out (as just described) and are only removed from the local mapping table/cache when a particular identifier is known to have moved, or the associated end device is confirmed to no longer be active via local probes on the leaf device or other appropriate mechanisms.

In some embodiments, each leaf device local mapping table/cache may also be pre-populated with one or more longest prefix match (LPM) entries which represent routes to one or more WAN interfaces attached to the fabric. In some embodiments, these are made present because the proxy function is more efficient if it is limited to only doing fully-qualified exact match lookups (LPM lookups may not be supported)—it may not be practical to enumerate all the possible destination identifier addresses outside of the fabric that an end-point may want to communicate with. This is why the WAN routes may need to be pre-populated in the mapping caches.

Similarly, in some embodiments, multicast lookups are not be supported by the proxy function. In such cases, multicast addresses may also need (depending on the embodiment) to be statically placed into the mapping caches along with the other static entries.

5. Communication of Learned Location/Identity Information from Leaf Devices to Spine and Proxy Devices, and to Other Leaf Devices The leaf devices may transmit learned information to the proxies, enabling the proxies to update their mapping tables. Since packets routed to the network are transmitted to one of the spine devices, by placing the proxies in the spine devices, no further hops are taken in the transmission of the packets. However, it is also possible to place the proxies at a server or leaf device.

In some embodiments, a separate mapper may maintain a mapping table. Such a mapper may be a trusted device. Packets may be routed by leaf devices directly to the mapper, enabling the mapper to forward the packets. Alternatively, a proxy may query the mapper, as appropriate. When the mapper receives a request from a proxy, the mapper may return the requested information to the proxy so that the proxy can forward the packets.

A leaf device may communicate the information pertaining to connected end devices to a single spine or proxy address. The spine or proxy address may be selected, for example, based upon an identity of the end device. In some instances, the proxy address may be a virtual address associated with more than one spine device or proxy.

In accordance with various embodiments, a protocol such as Border Gateway Protocol (BGP) or COOP may be used by the leaf devices to communicate information pertaining to connected end devices to the spine and/or proxy devices. The spine devices may also share learned identify/location information pertaining to end devices via a protocol such as the COOP protocol.

Through the use of the COOP protocol, the leaf devices may operate as citizens to communicate information to oracles at the proxies, and upon receiving the information from a citizen, the oracle(s) may populate or update the mapping table. The oracle(s) may also insure that each copy of the mapping database is consistent across the spine and proxy devices. Moreover, when an entry that already exists in the mapping database changes, the COOP protocol may be used to inform the leaf device whose citizen module created the entry that the entry is being changed. This gives that original leaf device an opportunity to take appropriate action such as creating a "bounce entry" in its local mapping table/cache. "Bounce entries" are described further below. Furthermore, while it is possible for a leaf device's citizen module to send information to a single oracle, the citizen may also send the information to a virtual IP address associated with multiple oracles.

6. Bouncing at Leaf Devices

When an end device is moved and arrives at its new location, it will ARP for itself (gratuitous ARP or a reverse ARP). Learning the new location may occur after the forwarding of one or more packets to the old location. A packet arriving at the old TEP (often a leaf device) corresponding to the end device's prior location cannot be locally forwarded to the end device, because the end device is no longer attached there.

To deal with this situation, in certain embodiments, a leaf device may create a so-called "bounce entry" in its forwarding table upon notification that an end device that was local to it moves to another leaf device (i.e. it is no longer local). This bounce entry is a mapping from the end device's unchanged identifier to its new location (TEP) on the network. When a bounce entry is hit upon by a packet that is received from the network, it is "bounced"—i.e., it is sent back into the fabric with the encapsulation identified by the bounce entry, specifically the new destination locator address. However, the source locator address of the packet is not modified. This action is similar to the proxy function, but executed at the leaf device of the end device's prior location. This bounced packet will then be forwarded to the new leaf device, which will update its cache with the proper source information.

The bounce entry may remain in effect until all of the cached entries of the end device identifier have been updated with the new locator information or have been aged out. This is bounded by the aging time of the cache on all the other leaf devices on the fabric.

7. Policy Enforcement at Leaf Devices

In some embodiments, the basic mechanism of policy enforcement is as follows: Policies may be based on source class, destination class, and packet fields. The source class and destination class are generally a function of the source or destination end device identifier. Policies are applied at the ingress leaf device when all fields necessary to apply policy to a particular packet are known when the packet is received by the ingress leaf device.

However, it is possible that there are some polices which depend upon the packet's destination class, and thus, when there is a miss in the ingress leaf device's local mapping cache, policy cannot be determined or applied at ingress. When the destination class cannot be determined at ingress and there are policies that depend upon this class, the policy applied (SP, DP) bits are not set and the packet is forwarded normally, i.e. to the egress leaf device via the proxy function. At the egress leaf device, since it generally has a static entry for all locally attached end device identifiers, the mapping cache lookup will return the destination class of the packet. At this point—i.e., at the egress leaf device—policy can then always be applied (since the source class is carried in the iVXLAN header, since the destination class has been determined via look-up, and since the remaining fields (upon which policy may potentially be based) are carried in the packet itself).

IV. Leaf-Spine Network Architecture

A. Introduction

In order to meet the demands of a worldwide user base, the modern datacenter may be composed of hundreds, thousands, or even tens of thousands of data servers. However, a large number of servers within a datacenter places a corresponding high demand on the datacenter's networking infrastructure. Network traffic taxing this infrastructure may represent communications between servers within the datacenter itself, or it may represent requests for information or services originating outside the datacenter, such as from client computers located throughout the worldwide internet (hereinafter just "internet"). With regards to the latter, the total number of servers in a datacenter is typically many times the total number of connections to the internet, and so the sharing of a limited number of internet connections between many servers is typically an important consideration.

B. "Access-Aggregation-Core" Network Architecture

Datacenter network design may follow a variety of topological paradigms—a given topology just referring to the system of networking lines/links which carry network traffic (i.e., data) and the networking switches, which control the flow of traffic over the lines/links in the network. One of the most common topological paradigms in use today is the aptly-named "access-aggregation-core" architecture. As the "core" part of the name suggests, such an architecture follows a hierarchical paradigm, wherein information traveling between hypothetical points A and B, first travel up the hierarchy away from point A and then back down the hierarchy towards point B. For communication from point A and an external, for example connected to the internet, device, the traffic travels up the hierarchy away from A towards the core and then goes directly from the core to the internet.

Figure 8:
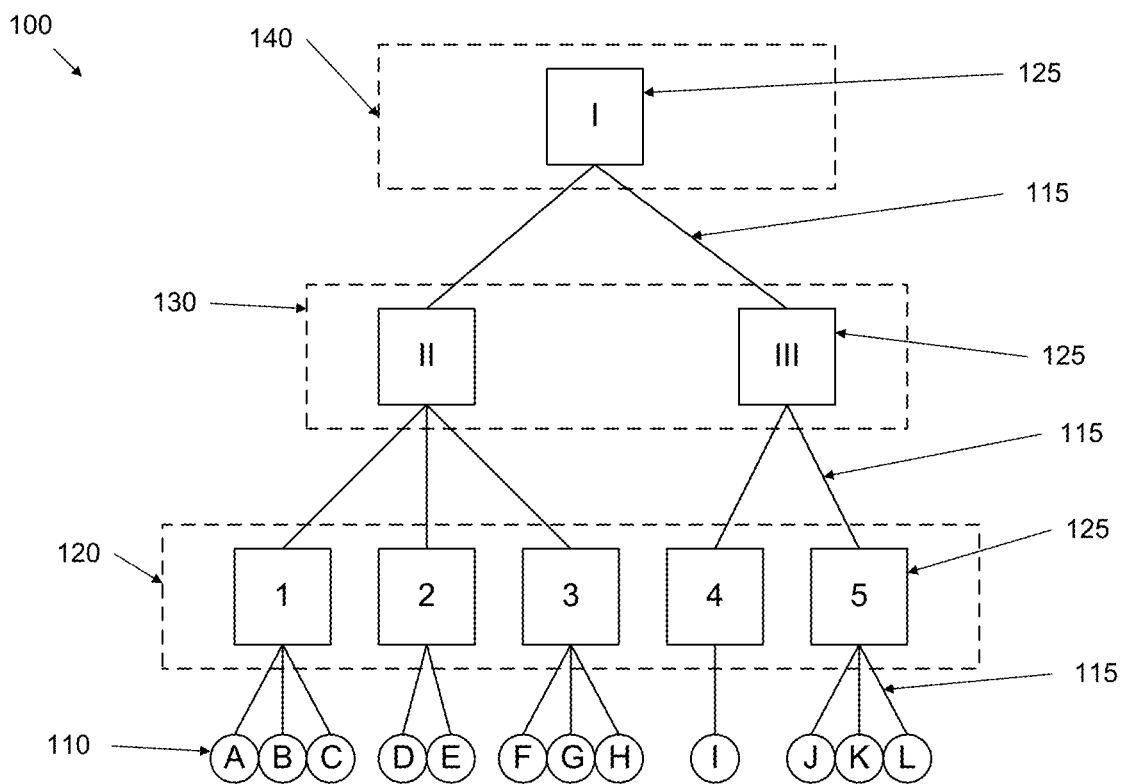
FIG. 8 schematically illustrates a network made up of 12 end devices which are connected through an access tier, an aggregation tier, and a top-level core tier.

FIG. 8 schematically illustrates a simple network 100 made up of 12 "end devices" 110 (e.g., servers) which, following the "access-aggregation-core" (AAC) model, are connected through an access tier 120, an aggregation tier 130, and a top-level core tier 140. Within each tier are "network devices" 125 (e.g., ethernet switches or routers) each of which controls flow of network traffic over various "links" 115 (e.g., ethernet cable) between it and the other network devices 125 and ultimately to and from end devices 110. As shown in FIG. 1, it is access tier 120 which provides each end device 110 with immediate access to the network. From there, traffic may pass to the aggregation tier 130, and then to the core tier 140, depending on its final destination. It is noted that for traffic whose final destination is within the network 100 shown in FIG. 1, how far up the hierarchy the traffic must be directed to reach this destination depends on the location of the destination within the network. Traffic whose final destination is outside the network shown in FIG. 1—e.g., to some server on the worldwide internet—will typically travel all the way up the hierarchy, since the connection or connections to the outside internet typically reside in the core tier. It is also noted that while FIG. 1 portrays each network device 125 identically for purposes of illustration, actual hardware implementations of such devices may possess substantial differences depending on whether the device is located in the access tier 120, the aggregation tier 130, or the core tier 140. For one thing, the single network device in the core tier 140 of FIG. 1 would typically route more traffic (for the reasons just described) than those network devices in the other layers, and so it's hardware would be chosen accordingly. Moreover, differing hardware implementations in one tier versus another may be dictated by whether the devices in each tier do bridging or routing, or both. For instance, the access tier typically does only bridging, the aggregation tier a combination of bridging and routing—bridging and routing between interfaces going to the access tier and routing to all others—and the core tier, only routing. Note that the term "end device" 110 refers to a device connected to the network which is identified on the network and uses the network to communicate with other devices connected to the network. As such, the end device 110 may be personal computer, a workstation, a server, or a device which may not be a computer per se such as, for example, a network printer, scanner, network storage device, etc. Also note that while a computer, server, workstation, etc. may be a physical device having one or more processors (each potentially having one or more cores) connected to an array of random-access memory (RAM) and possibly a non-volatile storage medium (such as a magnetic disc, flash drive, optical disc, magnetic tape, etc.), an end device 110 may also be a virtual device, such as a virtualized server running in a virtualization environment—such as VMWare—atop an actual physical server. Finally, it is also noted that in some embodiments, what is designated as an "end device," may actually refer to multiple computers, the distinction being that for purposes of network topology they share the same connection to the network and therefore operate substantially as a single networked unit.

FIG. 8 illustrates the hierarchal connectivity of a access-aggregation-core (AAC) network model and shows that, from core to end device, the architecture follows a tree structure or graph—meaning that each network device within the network is only connected to a single device above it in the hierarchy, but is potentially connected to multiple network devices below it. The tree structure also implies, as seen from the figure, that there is a single unique path—i.e., sequence of links—connecting any two end devices on the network. However, though each pair of end devices is connected by a unique path, paths between different pairs of end devices may, but not necessarily, use the same links along some portion of their route. For example, with regards to the specific network shown in FIG. 8, the end devices 110 labeled A and F (hereinafter "end device A" and so forth) communicate over a path through network devices 1, II, and then 3. Likewise end devices I and J communicate over a path through network devices 4, III, and then 5, and so these two paths do not overlap (i.e. the paths have no links in common). However, if end device A instead communicates with end device K (while I communicates with J), then both paths pass through network devices III and 5 (and the link adjoining devices III and 5).

Shared usage of links and network devices (such as just described) leads to bottlenecks in a network exhibiting a tree structure architecture like the access-aggregation-core (AAC) network shown in FIG. 8. For sake of simplicity, assume that in a given AAC network, data transmission over each link and through each network device is limited to the same maximum data transmission rate, and that each end device on this network can send and receive data at this maximum rate as well. In other words, the same bandwidth limitation applies to the whole network. If this is so, then referring again to FIG. 8, end devices A and B are able to communicate at full bandwidth, while end devices I and J are also communicating at full bandwidth. However, to use the previous example, if end device A attempts to communicate with end device K while end device I is communicating with end device J, then "blocking" occurs—e.g., either both pairs of end devices communicate at half maximum bandwidth, or they communicate at full bandwidth sequentially, one pair waiting for the other pair to finish. Obviously, the situation becomes much worse in a AAC network if many end devices which are topologically-separate from each other (i.e., their communication paths involve many links) attempt to simultaneously communicate with one another at full bandwidth.

Though the blocking problem is an inevitable consequence of the tree-structure paradigm, various solutions have been developed within this paradigm to lessen the impact of the problem. One technique is to build redundancy into the network by adding additional links between high traffic nodes in the network. In reference to FIG. 8, this might mean adding extra links between the core tier network device I, and the aggregation tier network devices II and III. Etherchannel and split-etherchannel and the like are examples implementing such an approach. Alternatively, instead of adding more links, standard-bandwidth links may be replaced by higher-bandwidth links, but the effect is essentially the same, albeit the consequences of link failure will be more severe versus having redundant links. With regards to link failure, it is noted in reference to FIG. 8 that even if redundant links are employed between the core and aggregation tiers, 1 link failure out of 4 in this simple example would reduce the network's bisectional bandwidth by a factor of 2. ("Bisectional bandwidth" is discussed in detail below.) Thus, it is evident that even with built-in redundancy, a tree-structured network architecture has inherent limitations, and, of course, there are costs associated with implementing hardware-based redundancy.

C. "Leaf-Spine" Network Architecture

Another way of addressing the ubiquitous "blocking" problem manifested in the modern datacenter's networking infrastructure is to design a new network around a topological paradigm where blocking does not present as much of an inherent problem. One such topology is often referred to as a "multi-rooted tree" topology (as opposed to a "tree"), which can be said to embody a full bi-partite graph if each spine network device is connected to each Leaf network device and vice versa. Networks based on this topology are oftentimes referred to as "Clos Networks," "flat networks," "multi-rooted networks," "fat trees", or just as "multi-rooted trees." In the disclosure that follows, a "leaf-spine" network architecture designed around the concept of a "multi-rooted tree" topology will be described. While it is true that real-world networks are unlikely to completely eliminate the "blocking" problem, the described "leaf-spine" network architecture, as well as others based on "multi-rooted tree" topologies, are designed so that blocking does not occur to the same extent as in traditional network architectures.

Roughly speaking, leaf-spine networks lessen the blocking problem experienced by traditional networks by being less hierarchical and, moreover, by including considerable active path redundancy. In analogy to microprocessor design where increased performance is realized through multi-core or multi-processor parallelization rather than simply by increasing processor clock speed, a leaf-spine network realizes higher performance, at least to a certain extent, by building the network "out" instead of building it "up" in a hierarchical fashion. Thus, a leaf-spine network in its basic form consists of two-tiers, a spine tier and leaf tier. Network devices within the leaf tier—i.e. "leaf network devices"—provide connections to all the end devices, and network devices within the spine tier—i.e., "spine network devices"—provide connections among the leaf network devices. Note that in a prototypical leaf-spine network, leaf network devices do not directly communicate with each other, and the same is true of spine network devices. Moreover, in contrast to an AAC network, a leaf-spine network in its basic form has no third core tier connecting the network devices within the second tier to a much smaller number of core network device(s), typically configured in a redundant fashion, which then connect to the outside internet. Instead, the third tier core is absent and connection to the internet is provided through one of the leaf network devices, again effectively making the network less hierarchical. Notably, internet connectivity through a leaf network device avoids forming a traffic hotspot on the spine which would tend to bog down traffic not travelling to and from the outside internet.

It should be noted that very large leaf-spine networks may actually be formed from 3 tiers of network devices. As described in more detail below, in these configurations, the third tier may function as a "spine" which connects "leaves" formed from first and second tier network devices, but a 3-tier leaf-spine network still works very differently than a traditional AAC network due to the fact that it maintains the multi-rooted tree topology as well as other features. To present a simple example, the top tier of a 3-tier leaf-spine network still does not directly provide the internet connection(s), that still being provided through a leaf network device, as in a basic 2-tier leaf-spine network.

Figure 9:
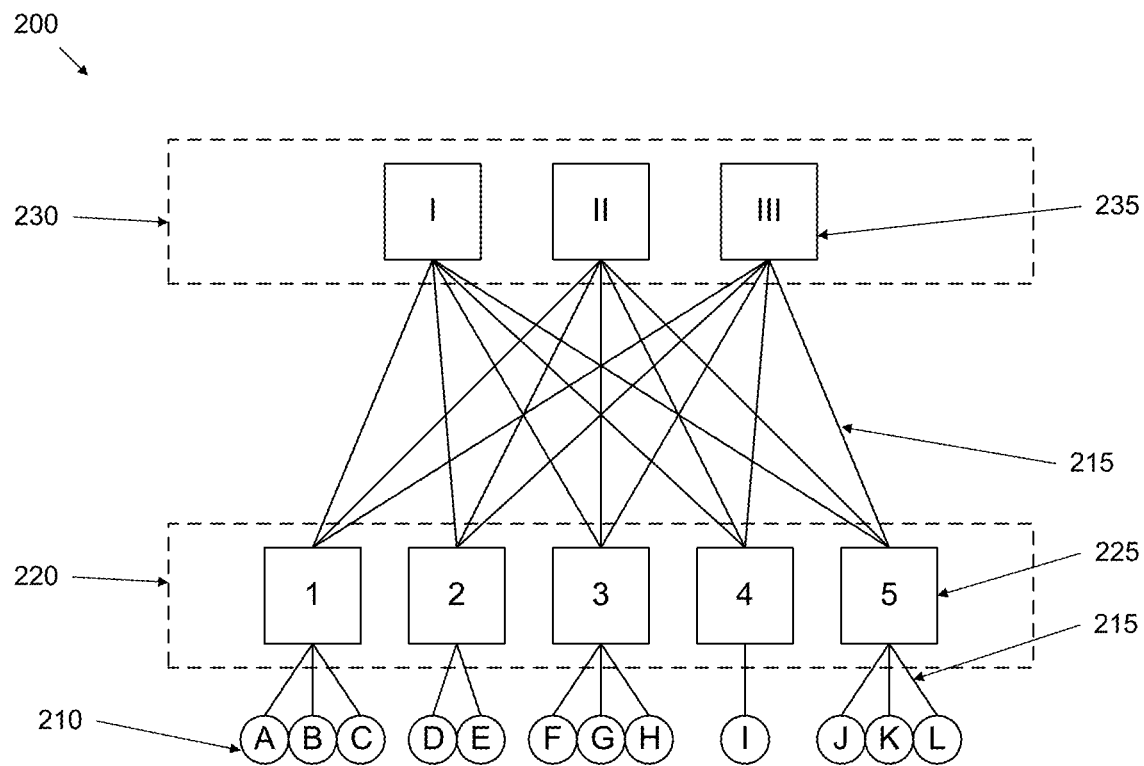
FIG. 9 schematically illustrates an example of a leaf-spine network.

FIG. 9 schematically illustrates a particular example of a basic leaf-spine network 200. To a certain extent, network 200 is analogous (or is the counterpart of) the AAC network 100 shown in FIG. 8. Both provide connectivity for 12 end devices which directly connect to 5 network devices in a first tier, in the case of network 200, to the 5 leaf network devices 225 of leaf tier 220, which are analogous to the 5 network devices 125 of the access tier 120 of the AAC network 100. However, moving on to the second tier, unlike the AAC network 100 which has a 2-network device aggregation tier 130 and a 1-network device core tier 140, the leaf-spine network 200 employs just a single additional tier, the spine tier 230, which consists of 3 spine-network devices 235.

Though in FIGS. 8 and 9 the total number of network devices in the higher tiers remains the same, the connectivity of these devices is quite different. FIG. 9 shows that in a prototypical leaf-spine network, every leaf network device 225 is connected to multiple spine network devices 235 creating the so-called "multi-rooted tree" topology—differing from the ordinary tree topology of an AAC network where each network device is connected to only one network device above it in the hierarchy. As a consequence and unlike an AAC network, in a leaf-spine network there are multiple paths of communication between any pair of leaf network devices 225, and thus also between any pair of end devices 210 connected to different leaf network devices. The multi-path topology which joins the end devices in these networks is a characteristic which helps to reduce the extent to which "blocking" poses a problem. Moreover, leaf-spine networks are such that if a sufficient number of spine network devices are connected with sufficient bandwidth to the leaf network devices, a leaf-spine network may provide what is referred to as "full bisectional bandwidth," as described in more detail below. Furthermore, by adding additional tiers (such as a third tier as mentioned above and as described in greater detail below), a network of arbitrary size can be built that still provides "full bisectional bandwidth."

To illustrate, consider analogously to the example described above, communication between end device A and end device K simultaneous with communication between end devices I and J, which led to blocking in AAC network 100. As shown in FIG. 9, in the leaf-spine network 200, there are three paths connecting end device A with end device K and three different paths connecting end device I with end device J illustrating that no blocking problem arises. Again, assuming all links in the network provide equal bandwidth, the two pairs of end devices each have available 3 times the required bandwidth for max rate communication and thus the network is non-blocking in this scenario.

As a second example, consider the scenario of simultaneous communication between end devices A and F and between end devices B and G which will clearly also lead to blocking in AAC network 100. In the leaf-spine network 200, although two leaf network devices 225 are shared between the four end devices 210, specifically network devices 1 and 3, there are still three paths of communication between these two devices (one through each of the three spine network devices I, II, and III) and therefore there are three paths collectively available to the two pairs of end devices. Thus, it is seen that this scenario is also non-blocking (unlike FIG. 8) because each pair of end devices still has access to 1.5 times the bandwidth required for max rate communication.

As a third example, consider the scenario of simultaneous communication between three pairs of end devices—between A and F, between B and G, and between C and H. In AAC network 100, this results in each pair of end devices having ⅓ the bandwidth required for full rate communication, but in leaf-spine network 200, once again, since 3 paths are available, each pair has exactly the bandwidth it needs for full rate communication. Thus, in a leaf-spine network having single links of equal bandwidth connecting devices, as long as the number of spine network devices 235 is equal to or greater than the number of end devices 210 which may be connected to any single leaf network device 225, then the network will have enough bandwidth for simultaneous full-rate communication between the end devices connected to the network.

More generally, the extent to which a given network is non-blocking may be characterized by the network's "bisectional bandwidth," which is determined by dividing a network that has N end devices attached to it into 2 equal sized groups of size N/2, and determining the total bandwidth available for communication between the two groups. If this is done for all possible divisions into groups of size N/2, the minimum bandwidth over all such divisions is the "bisectional bandwidth" of the network. Based on this definition, a network may then be said to have "full bisectional bandwidth" and have the property of being "fully non-blocking" if each leaf network device's total uplink bandwidth to the spine tier 230 (the sum of the bandwidths of all links connecting the leaf network device 225 to any spine network device 235) is at least equal to the maximum downlink bandwidth to end devices associated with any of the leaf network devices on the network.

To be precise, when a network is said to be "fully non-blocking" it means that no "admissible" set of simultaneous communications between end devices on the network will block—the admissibility constraint simply meaning that the non-blocking property only applies to sets of communications that do not direct more network traffic at a particular end device than that end device can accept as a consequence of its own bandwidth limitations. Whether a set of communications is "admissible" may therefore be characterized as a consequence of each end device's own bandwidth limitations (assumed here equal to the bandwidth limitation of each end device's link to the network), rather than arising from the topological properties of the network per se. Therefore, subject to the admissibility constraint, in a non-blocking leaf-spine network, all the end devices on the network may simultaneously communicate with each other without blocking, so long as each end device's own bandwidth limitations are not implicated.

The leaf-spine network 200 thus exhibits full bisectional bandwidth because each leaf network device has at least as much bandwidth to the spine tier (i.e., summing bandwidth over all links to spine network devices) as it does bandwidth to the end devices to which it is connected (i.e., summing bandwidth over all links to end devices). To illustrate the non-blocking property of network 200 with respect to admissible sets of communications, consider that if the 12 end devices in FIG. 9 are arbitrarily divided into 6 pairs, simultaneous communications between the 6 pairs are admissible, and thus may occur without blocking in network 200. In addition, it is noted that the non-blocking property of leaf-spine network 200 will be preserved if up to 15 end devices are connected, 3 to each of the 5 leaf network devices.

To implement leaf-spine network 200, the leaf tier 220 would typically be formed from 5 ethernet switches of 6 ports or more, and the spine tier 230 from 3 ethernet switches of 5 ports or more. The number of end devices which may be connected is then the number of leaf tier switches j multiplied by ½ the number of ports n on each leaf tier switch, or ½·j·n, which for the network of FIG. 9 is ½·5·6=15. Furthermore, the number of ports m on each spine tier switch is equal to the number of leaf tier switches j (so long as the maximum number of leaf tier switches are used), and so the total number of end devices is also given by ½·m·n, where m is the number of ports on the spine tier switches, and n is the number of ports on the leaf tier switches.

However, not every network is required to be non-blocking and, depending on the purpose for which a particular network is built and the network's anticipated loads, a fully non-blocking network may simply not be cost-effective. Nevertheless, leaf-spine networks still provide advantages over traditional networks, and they can be made more cost-effective, when appropriate, by reducing the number of devices used in the spine tier, or by reducing the link bandwidth between individual spine and leaf tier devices, or both. In some cases, the cost-savings associated with using fewer spine-network devices can be achieved without a corresponding reduction in bandwidth between the leaf and spine tiers by using a leaf-to-spine link speed which is greater than the link speed between the leaf tier and the end devices. If the leaf-to-spine link speed is chosen to be high enough, a leaf-spine network may still be made to be fully non-blocking—despite saving costs by using fewer spine network devices.

The extent to which a network having fewer spine tier devices is non-blocking is given by the ratio of bandwidth from leaf network device to spine tier versus bandwidth from leaf network device to end devices. By adjusting this ratio, an appropriate balance between cost and performance can be dialed in. In FIG. 9, for example, assuming links have equal bandwidth, one spine network device 235 could be eliminated if a non-blocking ratio of 2/3 was acceptable. This would imply that if 3 end devices connected to a single leaf network device attempt simultaneous communication to 3 or more end devices attached to other leaf networking devices, only 2/3 of the required bandwidth would be available. This is also referred to as "oversubscription." In this case, the "oversubscription rate" would be 1.5, since $1.5=(2/3)^{-1}$.

This concept of oversubscription and building cost-effective networks having fewer than optimal spine network devices also illustrates the improved failure domain provided by leaf-spine networks versus their traditional counterparts. In a traditional AAC network, if a device in the aggregation tier fails, then every device below it in the network's hierarchy will become inaccessible until the device can be restored to operation. Furthermore, even if redundancy is built-in to that particular device, or if it is paired with a redundant device, or if it is a link to the device which has failed and there are redundant links in place, such a failure will still result in a 50% reduction in bandwidth, or a doubling of the oversubscription. In contrast, redundancy is intrinsically built into a leaf-spine network and such redundancy is much more extensive. Thus, as illustrated by the usefulness of purposefully assembling a leaf-spine network with fewer spine network devices than is optimal, absence or failure of a single device in the spine (or link to the spine) will only typically reduce bandwidth by 1/k where k is the total number of spine network devices.

It is also noted once more that in some networks having fewer than the optimal number of spine network devices (e.g., less than the number of end devices connecting to the leaf network devices), the oversubscription rate may still be reduced (or eliminated) by the use of higher bandwidth links between the leaf and spine network devices relative to those used to connect end devices to the leaf network devices.

D. Example "Leaf-Spine" Network Architecture

The following describes a sample implementation of a leaf-spine network architecture. It is to be understood, however, that the specific details presented here are for purposes of illustration only, and are not to be viewed in any manner as limiting the concepts disclosed herein. With this in mind, leaf-spine networks may be implemented as follows:

Leaf network devices may be implemented as ethernet switches having: (i) 48 ports for connecting up to 48 end devices (e.g., servers) at data transmission speeds of 10 GB/s (gigabits per second)—i.e. 'downlink ports'; and (ii) 12 ports for connecting to up to 12 spine network devices at data transmission speeds of 40 GB/s—i.e. 'uplink ports.' Thus, each leaf network device has 480 GB/s total bandwidth available for server connections and an equivalent 480 GB/s total bandwidth available for connections to the spine tier. More generally, leaf network devices may be chosen to have a number of ports in the range of 10 to 50 ports, or 20 to 100 ports, or 50 to 1000 ports, or 100 to 2000 ports, wherein some fraction of the total number of ports are used to connect end devices ('downlink ports') and some fraction are used to connect to spine network devices ('uplink ports'). In some embodiments, the ratio of uplink to downlink ports of a leaf network device may be 1:1, or 1:2, or 1:4, or the aforementioned ratio may be in the range of 1:1 to 1:20, or 1:1 to 1:10, or 1:1 to 1:5, or 1:2 to 1:5. Likewise, the uplink ports for connection to the spine tier may have the same bandwidth as the downlink ports used for end device connection, or they may have different bandwidths, and in some embodiments, higher bandwidths. For instance, in some embodiments, uplink ports may have bandwidths which are in a range of 1 to 100 times, or 1 to 50 times, or 1 to 10 times, or 1 to 5 times, or 2 to 5 times the bandwidth of downlink ports.

Moreover, depending on the embodiment, leaf network devices may be switches having a fixed number of ports, or they may be modular, wherein the number of ports in a leaf network device may be increased by adding additional modules. The leaf network device just described having 48 10 GB/s downlink ports (for end device connection) and 12 40 GB/s uplink ports (for spine tier connection) may be a fixed-sized switch, and is sometimes referred to as a 'Top-of-Rack' switch. Fixed-sized switches having a larger number of ports are also possible, however, typically ranging in size from 50 to 150 ports, or more specifically from 48 to 128 ports, and may or may not have additional uplink ports (for communication to the spine tier) potentially of higher bandwidth than the downlink ports. In modular leaf network devices, the number of ports obviously depends on how many modules are employed. In some embodiments, ports are added via multi-port line cards in similar manner to that described below with regards to modular spine network devices.

Spine network devices may be implemented as ethernet switches having 576 ports for connecting with up to 576 leaf network devices at data transmission speeds of 40 GB/s. More generally, spine network devices may be chosen to have a number of ports for leaf network device connections in the range of 10 to 50 ports, or 20 to 100 ports, or 50 to 1000 ports, or 100 to 2000 ports. In some embodiments, ports may be added to a spine network device in modular fashion. For example, a module for adding ports to a spine network device may contain a number of ports in a range of 10 to 50 ports, or 20 to 100 ports. In this manner, the number of ports in the spine network devices of a growing network may be increased as needed by adding line cards, each providing some number of ports. Thus, for example, a 36-port spine network device could be assembled from a single 36-port line card, a 72-port spine network device from two 36-port line cards, a 108-port spine network device from a trio of 36-port line cards, a 576-port spine network device could be assembled from 16 36-port line cards, and so on.

Links between the spine and leaf tiers may be implemented as 40 GB/s-capable ethernet cable (such as appropriate fiber optic cable) or the like, and server links to the leaf tier may be implemented as 10 GB/s-capable ethernet cable or the like. More generally, links, e.g. cables, for connecting spine network devices to leaf network devices may have bandwidths which are in a range of 1 GB/s to 1000 GB/s, or 10 GB/s to 100 GB/s, or 20 GB/s to 50 GB/s. Likewise, links, e.g. cables, for connecting leaf network devices to end devices may have bandwidths which are in a range of 10 MB/s to 100 GB/s, or 1 GB/s to 50 GB/s, or 5 GB/s to 20 GB/s. In some embodiments, as indicated above, links, e.g. cables, between leaf network devices and spine network devices may have higher bandwidth than links, e.g. cable, between leaf network devices and end devices. For instance, in some embodiments, links, e.g. cables, for connecting leaf network devices to spine network devices may have bandwidths which are in a range of 1 to 100 times, or 1 to 50 times, or 1 to 10 times, or 1 to 5 times, or 2 to 5 times the bandwidth of links, e.g. cables, used to connect leaf network devices to end devices.

In the particular example of each spine network device implemented as a 576-port @ 40 GB/s switch and each leaf network device implemented as a 48-port @ 10 GB/s downlink & 12-port @ 40 GB/s uplink switch, the network can have up to 576 leaf network devices each of which can connect up to 48 servers, and so the leaf-spine network architecture can support up to 576·48=27,648 servers. And, in this particular example, due to the maximum leaf-to-spine transmission rate (of 40 GB/s) being 4 times that of the maximum leaf-to-server transmission rate (of 10 GB/s), such a network having 12 spine network devices is fully non-blocking and has full cross-sectional bandwidth.

As described above, the network architect can balance cost with oversubscription by adjusting the number of spine network devices. In this example, a setup employing 576-port switches as spine network devices may typically employ 4 spine network devices which, in a network of 576 leaf network devices, corresponds to an oversubscription rate of 3:1. Adding a set of 4 more 576-port spine network devices changes the oversubscription rate to 3:2, and so forth.

Datacenters typically consist of servers mounted in racks. Thus, in a typical setup, one leaf network device, such as the 'Top-of-Rack' device described above, can be placed in each rack providing connectivity for up to 48 rack-mounted servers. The total network then may consist of up to 576 of these racks connected via their leaf-network devices to a spine-tier rack containing between 4 and 12 576-port spine tier devices.

1. Leaf-Spine Network Architectures Formed from More than Two Tiers of Network Devices The two-tier leaf-spine network architecture described above having 576-port @ 40 GB/s switches as spine network devices and 48-port @ 10 GB/s downlink & 12-port @ 40 GB/s uplink switches as leaf network devices can support a network of up to 27,648 servers, and while this may be adequate for most datacenters, it may not be adequate for all. Even larger networks can be created by employing spine tier devices with more than 576 ports accompanied by a corresponding increased number of leaf tier devices. However, another mechanism for assembling a larger network is to employ a multi-rooted tree topology built from more than two tiers of network devices—e.g., forming the network from 3 tiers of network devices, or from 4 tiers of network devices, etc.

One simple example of a 3-tier leaf-spine network may be built from just 4-port switches and this is schematically illustrated in FIGS. 10A-1, 10A-2, and 10B, in order to convey the general principle. Of course, it is to be understood that to build a large 3-tier network, larger switches would be employed. FIG. 10A-1 shows 4 4-port switches 322 (labeled "1-1," "1-2," "1-3," "1-4") connected to form a 2-tier leaf-spine network 301 for connecting 4 end devices 310 (labeled "A," "B," "C," "D") with switches 1-1 and 1-2 serving as leaf network devices, and switches 1-3 and 1-4 serving as spine network devices. Note that a leaf-spine network assembled from 4-port switches would generally support a network of 8 end devices 310, connected through 2 spine-network devices and 4 leaf network devices, but here, half the ports on the switches serving as spine network devices, switches 1-3 and 1-4, have their links pointed upward in FIG. 10A-1 to schematically indicate these links are reserved for uplink connection to a third tier. With the 4 4-port switches 322 connected in this manner, they may collectively be viewed as functioning as an 8 port switch 325, as schematically illustrated in FIG. 10A-2 (and labeled "1"), with 4 downlinks 305 to potential end devices 310 and 4 uplinks 315 to a potential third tier. Such an effective 8-port switch may then serve as a building-block for a 3-tier leaf-spine network.

FIG. 10B then shows how a 3-tier leaf-spine network 302 may be assembled from these 8-port building blocks. As shown in the figure, 4 8-port building blocks 325 may effectively serve as 4 leaf-network devices (labeled "1," "2," "3," "4,") in the leaf tier 320 of network 302. The spine tier 330 of network 302 is formed from 4 additional 4-port switches 335 (labeled "I," "II," "III," "IV"), similar to those used to form each 8-port leaf network device 325. Thus, when viewed in terms of 4-port switches, network 302 consists of 3 tiers with 8 4-port switches in the bottom tier, 8 4-port switches in the middle tier, and 4 4-port switches in the top tier, though this network may still be viewed as having a leaf tier 320 and spine tier 330, as just described. It is seen in the figure, that network 302 may connect up to 16 end devices 310. Generalizing this, it is noted that a 3-tier leaf-spine network may connect a total number of end devices equal to $¼·l·m·n$, where l, m, and n are the number of ports in the devices forming the top, middle, and bottom tiers, respectively (e.g., in FIG. 10B, $¼·4·4·4=16$). Thus, if n-port devices are used to build a network, the size of a 3-tier leaf-spine network scales as approximately $n^3$, whereas the size of a 2-tier leaf-spine network scales only as $n^2$. Accordingly, leaf-spine network architectures employing 3 tiers of network devices open up the possibility of efficiently assembling even larger networks.

V. Example of Packet Walk Through

A. Normal Forwarding

The following constitutes a detailed example of network operation and packet forwarding "walk-through" consistent with some embodiments of the fabric overlay network described herein. However, since the following description only constitutes a particular example, the specific details recited should be viewed as illustrative rather than restrictive, and in no manner be viewed as limiting the more detailed description of concepts and embodiments provided above.

When the leaf-spine fabric overlay network initially powers on, the mapping database is empty and the local mapping tables/caches associated with the leaf devices are empty. The locator addresses of the TEPs at the leaf and proxy devices are configured by an Integrated Fabric Controller, IFC, using an object oriented data model application programming interface (API). The reachability of these addresses is understood through a protocol such as ISIS.

Wide area network (WAN) routes are imported at the edge of the network fabric and distributed via, e.g., iBGP running between the leaf and spine devices in the fabric. The leaf devices populate their local mapping tables/caches with these WAN routes.

When a leaf device discovers a new end-point, either based on packet arrival such as a gratuitous ARP or via the management API, it will tell its COOP Citizen process about that end-point and its locator, i.e. its own TEP address. The COOP Citizen will then inform the COOP Oracles which will then sync that information into the mapping database in the Spines. The mapping database will then populate the proxy function in the Spines with this mapping.

When an end point sends its first packet to another end point, the receiving/ingress leaf device will look up the destination identifier address, either MAC or IP, in its mapping cache. Assuming initially this will be a miss, the leaf device will then encapsulate the packet in an iVXLAN header and send it to the appropriate proxy address.

The proxy, upon receiving the packet, will extract the inner destination identifier address, MAC or IP depending on the proxy, and will look that address up in its mapping database. The result will be the destination locator and the interface to send the packet out of. The proxy will then replace the destination locator address of the packet's encapsulation header with the new destination locator address and send the packet to that TEP.

The egress TEP will lookup the destination identifier address in its local mapping cache when the packet is received. In some embodiments this will never result in a miss as this mapping cache is always populated with the addresses of the end devices locally attached to it. And, in this embodiment, if the network did not yet know about the end point, the packet would have been dropped in the spine. The results of this lookup in the local mapping cache/table are used to forward the packet to the attached end device, as well as to get the destination class of the local end point for use in policy enforcement. The egress leaf device will then apply the appropriate policies as a result of this look up and, if the packet should be forwarded (i.e., the looked-up policy doesn't forbid it), forward it.

The egress leaf device will also lookup the source identifier in its local mapping cache. If there is a miss, a new entry is created from the content of the packet. If there is a hit, but the content of the entry does not match that of the table, the table entry is updated. Either way, in this embodiment, the mapping cache will now hold the necessary information for a packet that travels in the opposite direction.

This end point has now received this first packet and, of course, it may respond to it. When it does respond, the ingress leaf device (the previous egress leaf device) will lookup the new incoming packet's destination identifier and have a hit in the mapping cache on the entry which was cached from the previous packet traveling in the reverse direction. This entry will contain the policy class of the destination, DClass. The DClass combined with the source policy class, SClass, also derived locally, combined with fields from the packet are then checked via a logic block (hardware or software) configured to apply access policy (e.g., determine whether the packet should be dropped or not, re-routed, re-encapsulated using an alternative encapsulation). For instance, in some embodiments, this overriding policy decision would be based on a policy defined by an administrator via an integrated fabric controller (IFC) and may be used to redirect traffic to an alternate location on the network to apply, for example, some service such as intrusion detection or stateful firewalling. In some embodiments, the logic block for applying access policy may be implemented in a content-addressable memory (CAM). The appropriate policy is then applied and, assuming the packet should not be dropped, the packet is encapsulated with the destination locator address returned from the mapping cache and the policy applied bits are set (in the encapsulation header) Finally the packet is forwarded to the destination TEP specified by its destination locator, whose reachability is known, e.g., through ISIS.

In this case, the spine device which receives the packet can simply forward it based on the destination locator address, i.e. the outer IP address, since it was known at ingress leaf device and applied to the packet. (If it hadn't been known, the destination locator field would have been set by the leaf to one of the proxy addresses, and the proxy function would be applied before forwarding from the spine, as described in detail above.)

The egress leaf device will do the mapping cache lookup on both source and destination identifier addresses to update the cache appropriately and to determine where to send the packet. Since the policy applied bits are set, no policy will be applied in the egress leaf device.

At this point, the mapping cache on both leaf devices has been updated to contain an entry associated with the end device locally attached to the other leaf device. All subsequent traffic will hit those cached entries.

B. Forwarding after an End Point Move

The following continues the previous example in order to illustrate an example of how a fabric-overlay network may handle an end-point move. Once again, this example is to be understood as a specific illustrative example rather than in any manner being construed as limiting to the more general disclosure and concepts provided herein.

After the normal start-up and forwarding operations just described, the leaf device-local mapping tables/caches are populated with appropriate entries.

For the purposes of this description, assume that end-point "Foo" initially is attached to leaf device "A" and then moves to leaf device "B".

When Foo moves from leaf device A to leaf device B, it will send a gratuitous ARP (GARP), to signal to the network its new location. The leaf device initially receiving the GARP packet will process it as well as forward it through the network.

This GARP (originating from leaf device B) will be forwarded to leaf device A since that is where the network thinks Foo is located when the GARP packet enters the overlay network (at leaf device B). On the egress path, leaf device A will see that Foo was previously a locally attached end point and is now attached to a different leaf device B. Accordingly, leaf device A will update its cache entry for Foo to be a "Bounce" entry pointing to leaf device B.

On leaf device B, upon receiving a copy of the GARP packet it will process it by updating its local mapping cache with a static entry for Foo and then it will inform the centralized mapping database of the update for Foo through the COOP protocol.

The spine devices will reprogram their local proxies with the new mapping information for Foo. In addition one of the spine devices will inform leaf device A that Foo has moved. If leaf device A received the GARP previously, which typically it would, then leaf device A takes no action. If the GARP was not received by leaf device A for any reason, it will install the Bounce entry in its mapping cache as if it had received the GARP. This provides protection against loss of the GARP packet(s).

At this point, leaf device A has a bounce entry for Foo pointing to leaf device B, leaf device B has a local entry for Foo, and the mapping database in the spine and/or proxy devices has a mapping entry for Foo pointing to leaf device B.

When a second end device now sends a packet to Foo, there are two possible scenarios. First, it may have a hit in its local mapping cache and that entry will likely point to leaf device A, i.e., it will be stale. In this case, the packet will be forwarded to leaf device A and will hit the bounce entry for Foo in leaf device A. This bounce entry will indicate to leaf device A to forward the packet on to leaf device B, but leave the source locator information unchanged and set the forwarding exception bit so that the packet when it arrives at leaf device B will look as if it was sent there directly from the leaf device where the second device was attached. Leaf device B can then do its normal caching algorithm on this packet. When Foo responds to the second end device, the cache in the leaf where the second end device is attached will then be updated with Foo's new location, and all subsequent packets from the second device to Foo will be appropriately sent to leaf device B.

The second scenario is that the remote ingress leaf device to which the second end device is attached has a miss when looking up Foo in its local mapping cache/table. In this case, it will forward the packet to the proxy and the proxy will have the up-to-date mapping information, i.e. Foo maps to leaf device B. The packet is then forwarded normally.

In summary, when an end device moves, forwarding tables/caches are updated at three locations in the network (and potentially more) so that packets are properly and efficiently delivered to the new location: (i) the leaf device constituting the new location where the device is attached so this leaf device can forward out its local port correctly, (ii) the leaf device constituting the old location where the device was attached so it can install a bounce entry pointing to the new location, and (iii) the spine so that subsequent cache misses are sent directly to the correct location. Other leaf devices may also have their local mapping caches/tables updated with entries for the moved end device if their attached end devices send packets to and/or from the moved end device. On the other hand, leaf devices not transmitting packets to and/or from the moved end device will have their stale cache entries corresponding to this device aged out.

VI. Other Embodiments

Although the foregoing processes, methods, techniques, operations, systems, apparatuses, devices, hardware, software, etc. have been described in some detail for the purpose of promoting clarity of understanding, it will be apparent to one of ordinary skill in the art that certain changes, modifications, and alternate implementation that may be practiced within the scope of the appended claims. Accordingly, the disclosed embodiments are to be considered as illustrative and not restrictive, and the scope of each appended claim is not to be inappropriately limited to the specific details of the embodiments described herein.

We claim:
1. A method comprising:
receiving a packet at an ingress leaf device of a leaf-spine network, the packet including a header with a destination locator address;
determining by the ingress leaf device of the leaf-spine network based, at least in part, on the header of the packet whether the packet is to be transmitted to a device of the leaf-spine network;
ascertaining whether to perform encapsulation on the packet based at least in part on the header of the packet and whether the packet is to be transmitted into a fabric of the leaf-spine network or outside the fabric of the leaf-spine network;
encapsulating by the ingress leaf device of the leaf-spine network the packet according to a result of the ascertaining such that an encapsulated packet is generated, the encapsulated packet including another destination locator address of a proxy device of the leaf-spine network; and after encapsulating the packet according to the result of the ascertaining, transmitting the encapsulated packet to the proxy device of the leaf-spine network.

2. The method of claim 1, wherein the packet is received from another device, the method further comprising:
determining whether the another device is a trusted device or a partially-trusted device,
wherein,
the ascertaining is based, at least in part, upon whether the another device is the trusted device or the partially-trusted device.

3. The method of claim 1, further comprising:
determining that the packet has previously been encapsulated; and
determining a type of encapsulation of the packet,
wherein,
the ascertaining is based, at least in part, upon the type of encapsulation of the packet.

4. The method of claim 1, wherein the ascertaining is performed based, at least in part, upon whether the packet is to be transmitted to the device.

5. The method of claim 1, further comprising:
selecting one of two or more spine devices,
wherein,
the transmitting comprises sending the packet to a selected one of the two or more spine devices.

6. The method of claim 5, wherein the selecting of the one of the two or more spine devices is performed based, at least in part, on the header of the packet.

7. The method of claim 6, wherein the selecting of the one of the two or more spine devices is further performed based, at least in part, upon a flow associated with the packet.

8. The method of claim 1, further comprising:
selecting one of two or more proxies,
wherein,
the transmitting comprises sending the packet to a selected one of the two or more proxies.

9. The method of claim 8, wherein the selecting of the one of the two or more proxies is performed based, at least in part, on the header of the packet.

10. The method of claim 9, wherein the selecting of the one of the two or more proxies is further performed based, at least in part, upon a flow associated with the packet.

11. The method of claim 8, wherein the encapsulated packet includes a header with a proxy address of a proxy implemented in one or more servers.

12. The method of claim 8, wherein the encapsulated packet includes a header with a proxy address of a proxy implemented in one or more spine devices.

13. The method of claim 8, wherein the encapsulated packet includes a header with a proxy address of a layer 2 proxy.

14. The method of claim 8, wherein the encapsulated packet includes a header with a proxy address of a layer 3 proxy.

15. The method of claim 1, wherein the determining is performed using an adjacency table maintained by the ingress leaf device.

16. A method comprising:
receiving a packet at an ingress leaf device of a leaf-spine network, the packet including a header with a destination locator address;
determining by the ingress leaf device of the leaf-spine network based, at least in part, on the header of the packet that the packet is to be transmitted to a spine device of the leaf-spine network;
ascertaining whether to perform encapsulation on the packet based at least in part on the header of the packet and whether the packet is to be transmitted into a fabric of the leaf-spine network or outside the fabric of the leaf-spine network;
encapsulating by the ingress leaf device of the leaf-spine network the packet according to a result of the ascertaining such that an encapsulated packet is generated, the encapsulated packet including another destination locator address of a proxy device of the leaf-spine network; and
after encapsulating the packet according to the result of the ascertaining, transmitting the encapsulated packet to the proxy device of the leaf-spine network according to a result of the determining.

17. The method of claim 16, wherein the ascertaining whether to perform encapsulation on the packet is based at least in part on the header of the packet.

18. An apparatus comprising:
a processor; and
a memory, at least one of the processor or the memory being configured to:
receive a packet at a leaf device of a leaf-spine network, the packet including a header with a destination locator address;
determine by the leaf device of the leaf-spine network based, at least in part, on the header of the packet whether the packet is to be transmitted to a spine device;
ascertain whether to perform encapsulation on the packet based at least in part on the header of the packet and whether the packet is to be transmitted into a fabric of the leaf-spine network or outside the fabric of the leaf-spine network;
encapsulate by the leaf device of the leaf-spine network the packet according to a result of ascertaining whether to perform encapsulation on the packet such that an encapsulated packet is generated, the encapsulated packet including another destination locator address of a proxy device of the leaf-spine network; and
after encapsulating the packet according to the result of the ascertaining, transmit the encapsulated packet to the proxy device of the leaf-spine network.

19. The apparatus of claim 18, wherein the memory and/or the processor are further configured to ascertain by the leaf device of the leaf-spine network based, at least in part, on the header of the packet whether to perform encapsulation on the packet.

20. The apparatus of claim 18, wherein the memory and/or the processor are configured to determine whether the packet is to be transmitted to the spine device using an adjacency table.

* * * * *